United States Patent
Stevens

(10) Patent No.: US 11,575,531 B2
(45) Date of Patent: Feb. 7, 2023

(54) DYNAMIC VIRTUAL ENVIRONMENT

(71) Applicant: Preciate Inc., Dallas, TX (US)

(72) Inventor: Edward Allen Stevens, Dallas, TX (US)

(73) Assignee: Preciate Inc., Dallas, TX (US)

(*) Notice: Subject to any disclaimer, the term of this patent is extended or adjusted under 35 U.S.C. 154(b) by 111 days.

(21) Appl. No.: 17/337,293

(22) Filed: Jun. 2, 2021

(65) Prior Publication Data

US 2021/0377062 A1 Dec. 2, 2021

Related U.S. Application Data

(60) Provisional application No. 63/033,715, filed on Jun. 2, 2020.

(51) Int. Cl.
*H04L 12/18* (2006.01)
*G06F 16/955* (2019.01)
*G06F 3/04817* (2022.01)
*G06F 3/16* (2006.01)

(52) U.S. Cl.
CPC ...... *H04L 12/1822* (2013.01); *G06F 3/04817* (2013.01); *G06F 3/165* (2013.01); *G06F 16/955* (2019.01); *H04L 12/1827* (2013.01)

(58) Field of Classification Search
None
See application file for complete search history.

(56) References Cited

U.S. PATENT DOCUMENTS

| 8,406,439 | B1 | 3/2013 | Bedingfield et al. |
| 2004/0128350 | A1* | 7/2004 | Topfl ........... H04N 7/147 709/204 |
| 2006/0067500 | A1* | 3/2006 | Christofferson ...... H04M 3/56 379/202.01 |
| 2012/0121076 | A1* | 5/2012 | Yoakum ............ H04L 12/1822 379/202.01 |
| 2013/0227437 | A1 | 8/2013 | Brody et al. |

FOREIGN PATENT DOCUMENTS

| EP | 1599018 | 11/2005 |
| WO | WO 2008/125593 | 10/2008 |

OTHER PUBLICATIONS

International Search Report and Written Opinion in International Appln. No. PCT/US2021/0035538, dated Nov. 10, 2021, 25 pages.

(Continued)

Primary Examiner — Tuan S Nguyen
(74) Attorney, Agent, or Firm — Fish & Richardson P.C.

(57) ABSTRACT

Techniques for conducting a virtual event are described. One example method includes displaying, on a display screen of a computing device, a plurality of icons, each icon representing a different virtual event participant, wherein the plurality of icons includes a first icon representing a virtual event participant associated with the computing device; receiving, from an input device of the computing device, input representing a direction of movement for the first icon; and in response to receiving the input, moving the first icon on the display screen in the direction represented by the input.

41 Claims, 21 Drawing Sheets

(56) References Cited

OTHER PUBLICATIONS

Invitation to Pay Fees and, Where Applicable, Protest Fee in International Appln. No. PCT/US2021/035538, dated Sep. 20, 2021, pages.

Jongman Kim [online]," 김종만(종맨킴 )Group FaceTime on iPhone—A Little Company—Apple," published Nov. 30, 2018, retrieved on Oct. 5, 2021, <https://www.youtube.com/watch?v=94b-ub4rB4s>, 1 page [Video Submission].

Nakanishi et al., "FreeWalk: A meeting environment for casual communication in a net-worked community," IEEE Multimedia, Apr. 1, 1999, 6(2): 20-28.

\* cited by examiner

DYNAMIC VIRTUAL ENVIRONMENT

RELATED APPLICATION

This application claims priority to U.S. provisional patent application No. 63/033,715, filed Jun. 2, 2020, the contents of which (including Appendix A) are hereby incorporated by reference in their entirety.

BACKGROUND

Virtual event venues such as ZOOM® enable multiple meeting participants to conduct a meeting, social gathering, or the like via a web browser executing on an internet-connected device. As shown in FIG. 1, meeting participants are depicted in a stationary grid of windows 100. Within each window, a participant can share video (e.g., of him or herself) and audio that can be seen and heard equally by all other participants.

SUMMARY

This disclosure relates to dynamic virtual venues in which, for example, virtual participants (each represented as a separate icon such as a "bubble") can move around within a virtual environment to get closer or farther away from each other in a manner similar to how actual human participants would move around a physical environment. The audio (e.g., speech) of each participant is adjusted to be louder or quieter depending on how close their respective icons are within the virtual environment, similar to how the volume of conversations of people at a physical gathering varies depending on how close they are to each other. The dynamic virtual venue may also include stationary audio sources (e.g., music), virtual games that two or more participants can play, virtual toasts, and the like.

In an exemplary implementation, conducting a virtual event may be accomplished by displaying, on a display screen of a computing device, a plurality of icons, each icon representing a different virtual event participant, wherein the plurality of icons includes a first icon representing a virtual event participant associated with the computing device; receiving, from an input device of the computing device, input representing a direction of movement for the first icon; and in response to receiving the input, moving the first icon on the display screen in the direction represented by the input.

In some implementations, the first icon comprises video of the virtual event participant associated with the computing device.

Some implementations include receiving, by the computing device, audio signals associated with a second icon of the plurality of icons; and playing, by the computing device, the received audio signals at a particular volume based on a distance between the first icon and the second icon on the display screen.

In some cases, the particular volume decreases as the distance between the first icon and the second icon on the display screen increases.

In some implementations, the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

Some implementations include receiving, by the computing device, a plurality of audio signals each associated with one of the plurality of icons; and playing, by the computing device, each of the received plurality of audio signals at a particular volume based on the distance between the first icon and the icon associated with the received audio signal on the display screen.

Some implementations include receiving, by the computing device, input designating a particular icon from the plurality of icons upon which to focus; and in response to the input, playing, by the computing device, audio signals associated with the particular icon at a first volume level, and playing audio signals associated with icons other than the particular icon at a second volume level, wherein the first volume level is greater than the second volume level.

In an exemplary implementation, conducting a virtual event may be accomplished by displaying, on a display screen of a computing device, a plurality of icons, each icon representing a different virtual event participant, wherein the plurality of icons includes a first icon representing a virtual event participant associated with the computing device; identifying, by the computing device, a subset of the plurality of icons including the first icon; grouping, by the computing device, the subset of the plurality of icons into an audio group; receiving, by the computing device, a plurality of audio signals each associated with one of the plurality of icons; and playing, by the computing device, each of the received plurality of audio signals, wherein audio signals received from icons included in the audio group are played at a first volume, wherein audio signals received from icons not included in the audio group are played at a second volume, and wherein the first volume is greater than the second volume.

In some implementations, identifying the subset of the plurality of icons includes identifying icons that are located within a certain distance of each other.

In some implementations, identifying the subset of the plurality of icons includes receiving user input identifying the icons.

Some implementations include identifying, by the computing device, an icon from the plurality of icons that is not included within the audio group; and in response, adding, by the computing device, the identified icon to the audio group.

In some cases, identifying the icon from the plurality of icons that is not included within the audio group includes identifying the icon based on the icon's proximity to the audio group.

In some implementations, wherein identifying the icon from the plurality of icons that is not included within the audio group includes identifying the icon based on a speed at which the icon is approaching a location of the audio group on the display screen.

In some cases, identifying the icon from the plurality of icons that is not included within the audio group includes identifying the icon based on an amount of time the icon has spent within a predetermined distance from a location of the audio group on the display screen.

In some implementations, identifying the icon from the plurality of icons that is not included within the audio group includes receiving user input identifying the icon.

Some implementations include displaying, on the display screen, a visual indication of which icons from the plurality of icons are included in the audio group.

In an exemplary implementation, conducting a hybrid physical and virtual event may be accomplished by providing a kiosk arranged in a physical meeting space, the kiosk including a microphone, a camera, an input device, and a display screen, and being connected to a communications network; displaying, on the display screen of the kiosk, a plurality of icons, each icon representing a different virtual event participant associated with a remote computing device; updating, on the display screen of the kiosk, a location at which each of the plurality of icons is displayed based on user input received by the remote computing device associated with each icon; and receiving, by the kiosk, a plurality of audio signals associated with one or more of the plurality of icons; and playing, by the kiosk, each of the received plurality of audio signals at a particular volume based on a distance between the icon representing the kiosk and the icon associated with the received audio signal on the display screen.

In an exemplary implementation, conducting a virtual event may be accomplished by displaying, on a display screen of a computing device, a plurality of icons, each icon representing a different virtual event participant; identifying, by the computing device, metadata associated with one or more virtual event participants represented by the plurality of icons, wherein the metadata includes at least one of a name, a title, an organization, an industry, or a relationship to another virtual event participant; and selectively providing, by the computing device, metadata associated with a particular virtual event participant to one or more other virtual event participants.

In an exemplary implementation, conducting a virtual event may be accomplished by identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices; identifying, by the server computing device, a presenter device from the plurality of computing devices; and in response to identifying the presenter device, instructing, by the server computing device, the plurality of participant computing devices to playback audio signals transmitted by the presenter device at a presenter volume, and to playback audio signals transmitted by participant computing devices other than the presenter device at an audience volume, wherein the audience volume is less than the presenter volume.

In an exemplary implementation, conducting a virtual event may be accomplished by identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices; identifying, by the server computing device, a presenter device from the plurality of computing devices; in response to identifying the presenter device, instructing, by the server computing device, the plurality of participant computing devices to playback audio signals transmitted by the presenter device at a presenter volume, and to mute or reduce a volume of audio signals transmitted by participant computing devices other than the presenter device; receiving, by the server computing device, a push-to-talk request from a requesting computing device; and in response to receiving the push-to-talk request, instructing, by the server computing device, the plurality of participant computing devices to playback audio signals transmitted by the presenter device at the presenter volume, to playback audio signals transmitted by the requesting computing device at a push-to-talk volume, and to mute or reduce the volume of audio signals transmitted by participant computing devices other than the presenter device or the requesting computing device.

In an exemplary implementation, conducting a virtual event may be accomplished by identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices; identifying, by the server computing device, a presenter device from the plurality of computing devices; identifying, by the server computing device, an audience feedback subset from the plurality of computing devices other than the presenter device; and instructing, by the server computing device, the plurality of participant computing devices to playback audio signals transmitted by the presenter device at a presenter volume, to playback audio signals transmitted by participant computing devices in the audience feedback subset at an audience volume, and to mute or reduce the volume of audio signals transmitted by participant computing devices that are not included in the audience feedback subset and that are not the presenter device.

In some implementations, the audience feedback subset is a first audience feedback subset, and the implementations include determining, by the server computing device, that a particular amount of time has passed since identifying the first audience feedback subset; in response to determining that the particular amount of time has passed, identifying, by the server computing device, a second audience feedback subset from the plurality of computing devices, wherein the second audience feedback subset is different than the first audience feedback subset; and instructing, by the server computing device, the plurality of participant computing devices to playback audio signals transmitted by the presenter device at the presenter volume, to playback audio signals transmitted by participant computing devices in the second audience feedback subset at the audience volume, and to mute or reduce the volume of audio signals transmitted by participant computing devices that are not included in the second audience feedback subset and that are not the presenter device.

In an exemplary implementation, conducting a virtual event may be accomplished by identifying, by a server computing device, a plurality of participant computing devices connected to the server computing device by a communications network, each participant computing device associated with a participant in the virtual event, wherein the server is configured to selectively control playback of video signals transmitted by any of the participant computing devices on the other participant computing devices in the plurality of participant computing devices; identifying, by the server computing device, a video enhancement subset from the plurality of participant computing devices; and instructing, by the server computing device, participant computing devices in the video enhancement subset to transmit video signals at a first video quality level, and instructing to participant computing devices that are not in the video enhancement subset to transmit video signals at a second video quality level, wherein the first video quality level is higher than the second video quality level.

In an exemplary implementation, conducting a virtual event may be accomplished by identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices; identifying, by the server computing device, a presenter device from the plurality of computing devices; in response to identifying the presenter device, instructing, by the server computing device, the plurality of participant computing devices to playback audio signals transmitted by the presenter device; receiving, by the server computing device, a request to mute the presenter from a particular computing device; and in response, instructing, by the server computing device, the particular computing device to mute audio signals transmitted by the presenter device, wherein the plurality of participant computing devices other than the particular computing device continue to playback audio signals transmitted by the presenter device.

In an exemplary implementation, conducting a virtual event may be accomplished by identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices; identifying, by the server computing device, an inattentive participant based on either or both audio or video signals transmitted by a participant computing device associated with the inattentive participant; and in response to identifying the inattentive participant, performing, by the server computing device, one or more corrective actions to the participant computing device associated with the inattentive participant including at least one of muting a microphone of the participant computing device, blocking audio transmitted by the participant computing device for a period of time, blocking video transmitted by the participant computing device for a period of time, or sending the participant computing device a warning message for display to the inattentive participant.

In an exemplary implementation, conducting a virtual event may be accomplished by identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices; determining, by the server computing device, a metric associated with social activity of a particular participant based on interactions by the particular participants with other participants in the virtual event; and providing, by the server computing device, the metric associated with the social activity of the particular participant to the participant computing device associated with the particular participant.

In an exemplary implementation, conducting a virtual event may be accomplished by identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices; determining, by the server computing device, a prompt for display to a particular participant based on intent information provided by the particular participant, wherein the prompt includes at least one of a suggested interaction with a target participant, a suggested navigation action configured to move a display location of an icon associated with the particular participant closer to a display location of an icon associated with the target participant, or information about a target participant; and instructing, by the server computing device, the participant computing device associated with the particular participant to display the prompt on a display screen of the participant computing device.

In an exemplary implementation, conducting a virtual event may be accomplished by identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices; assigning, by the server computing device, display locations to a plurality of icons each associated with one of the plurality of participant computing devices, wherein each of the plurality of participant computing devices is configured to display each of the plurality of icons at the assigned display locations on a display screen at each participant computing device; assigning, by the server computing device, a display location to a game object icon, wherein each of the plurality of participant computing devices is configured to display the game object icon at the assigned display location; receiving, by the server computing device, directional input signals from at least a portion of the plurality of computing devices, each directional input signal associated with one of the plurality of computing devices; in response to receiving the directional input signals, selectively updating, by the server computing device, the display locations of each icon of the plurality of icons associated with a participant computing that is associated with a received directional input signal; detecting, by the server computing device, collisions between icons from the plurality of icons and between the icons and the game object icon; and in response to detecting the collisions, selectively updating, by the server computing device, the display locations of the plurality of icons and the game object icon based on the detected collisions.

In an exemplary implementation, conducting a virtual event may be accomplished by identifying, by a server computing device, a plurality of participant computing devices connected to the server computing device by a communications network, each participant computing device associated with a participant in the virtual event, wherein the server is configured to selectively control playback of audio and video signals transmitted by any of the participant computing devices on the other participant computing devices in the plurality of participant computing devices; receiving, by the server computing device, a request from a presenter computing device from the plurality of participant computing devices to share video signals displayed on a display screen of the presenter computing device with a set of participant computing devices from the plurality of participant computing devices; and providing, by the server computing device, video signals transmitted by the presenter computing device to the set of participant computing devices for display on a display screen of each participant computing device.

In an exemplary implementation, conducting a virtual event may be accomplished by identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices; receiving, by the server computing device, a request from one of the plurality of participant computing devices to place a graphical object at a particular display location within the virtual event environment; and in response to receiving the request, instructing, by the server computing device, the plurality of participant computing devices to display the graphical object at the particular display location within the virtual event environment on a display screen associated with each participant computing device.

Some implementations include receiving input from a participant computing device to interact with the graphical object, thereby enabling the particular computing device to access the graphical object's associated functionality.

In some implementations, the graphical object's functionality includes at least one of the following: displaying information relating to the graphical object, the information including one or more of descriptive text, a Uniform Resource Locator (URL), a still image, or a video image; or changing an appearance of the graphical object; or alerting another participant's computing device that the particular computing device has interacted with the graphical object.

In some implementations, the graphical object is associated with a product for sale and includes a Uniform Resource Locator (URL) associated with a webpage providing information about the product for sale.

In an exemplary implementation, conducting an event within a virtual event environment may be accomplished by executing, by a server computing device, a predetermined macro including instructions for configuring attributes of the virtual event environment including at least one of a background, a theme, an agenda, a featured activity, or a featured video presentation; and identifying, by the server computing device, a plurality of participant computing devices connected to the server computing device by a communications network, each participant computing device associated with a participant in the virtual event, wherein each participant computing device displays a graphical representation of the virtual event environment on a display screen associated with the participant computing device.

Some implementations include, prior to executing the macro, downloading, by the server computing device, the macro from an online marketplace including a plurality of macros.

Some implementations include, prior to executing the predetermined macro, receiving input from an event planner relating to one or more of a specific environment for the virtual event, one or more specific event activities to be performed during the virtual event, or different resources to be made available to event participants during the virtual event; and modifying the macro to include the input received from the event planner.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
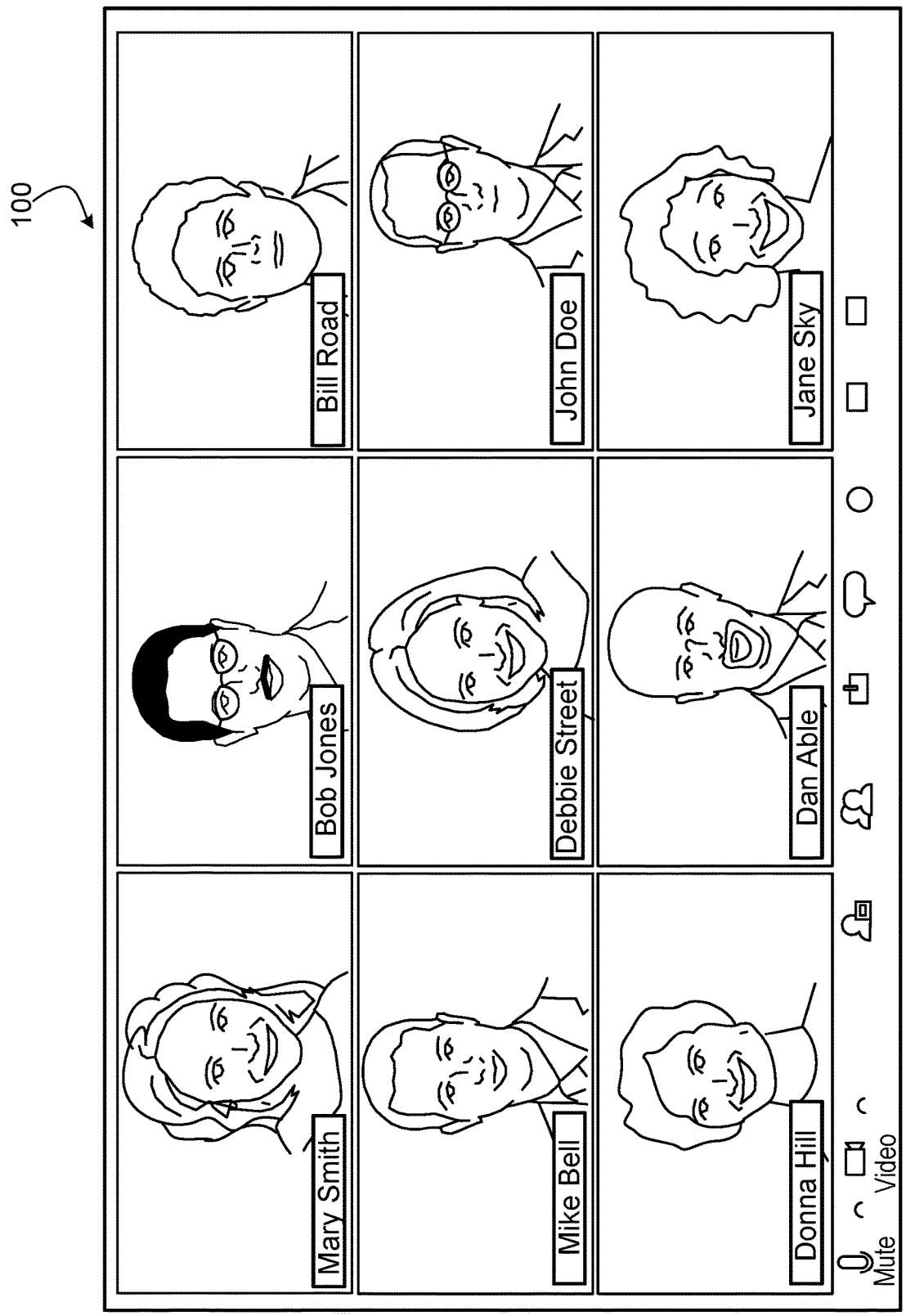
FIG. 1 illustrates a conventional virtual event environment.

This disclosure relates to virtual environments (or venues), for example, in which colleagues, friends, associates, family members and the like can build or maintain relationships without being physically together. Such virtual venues can be used for essentially any event in which two or more people may interact, including but not limited to business meetings, social events, performances, speeches, and the like. Companies and organizations benefit when their employees have stronger relationships with each other. Employees benefit when they have stronger relationships with their co-workers, family, and friends. Customers and the companies and organizations that serve them also benefit when people involved in transactions have stronger relationships.

Relationships are most naturally strengthened through in-person interactions. Before technology like telephones, computers, and the internet, the most effective way to build relationships was in person. As technology has become a part of human existence, it has been utilized to help people build relationships.

Making a telephone call and talking with someone enables a dialogue to discover shared values, identify mutual goals, coordinate activities, and reciprocate for help given. Sending email can provide similar opportunities for people to connect and grow closer.

The advent of video conferencing has made it possible to combine a phone call with a real-time visual representation of an individual. Not only can the participants hear each other's voices. They can also see facial expressions and share the screens of their computers with each other.

Video conferencing tools like ZOOM or GO TO MEETING are effective ways for small groups of people to build relationships (ideally 1:1), but they are ineffective for larger groups. They do not enable the types of social interactions that are common in larger social gatherings.

In a natural, in-person social gathering, people move around the room to enter and exit conversations as they determine to be optimal for their relationship-building goals. They can hear voices at variable levels of volume, which communicates who is having fun, who might be preparing to leave, and who is struggling with relationship building.

Also, it is common for social gatherings to include games, media like music or video, decorations such as balloons and colored themes, live performers such as magicians, artists, and musicians, and toasts and recognition of others.

In today's world with remote work becoming more popular and some people unable to come to work or travel, companies and organizations cannot rely upon in-person social gatherings to build relationships. Yet they do not have tools that combine technologies to gather remotely and yet also maximize social interactivity, enable use of all social cues available, and reproduce the same informal and spontaneous interactions required for real relationship building.

The present inventors recognized that what is needed is a remote social technology that combines all of the elements of socializing in person and translates them into something that can be experienced remotely.

Potential key elements of this technology combination may include one or more of the following, details of which are described below.

Enabling more than one speaker to speak at a time.
Allowing participants to move their presence in the social virtual environment to get closer to people with whom they want to socialize, and to move farther away from people with whom they do not want to socialize.
Adjusting the volume of voices to be proportional to the distance between people.
Locating music, entertainment, or content in places that allow participants to get farther away from or closer to it, thus adjusting volume and how dominant the music, entertainment, or content is in the individual's socializing experience.
Providing for live entertainment and the ability to move closer to or away from it, thereby adjusting the audio volume proportionately.
Enabling team-building games and activities that are customized to the needs of the participants.
Enable one participant to click on a button and "focus" on another participant, to increase their audio volume and decrease the audio volume of others.
Provide a physics-based experience, where each icon has mass, velocity, and momentum. If one icon bumps into another one, it is moved. If there is a group of icons near each other, in a clump, then another icon may not have sufficient mass to break up the clump nor to move through it. This replicates the "pushing way through a crowd" social cue.
The mass of an icon can be modified as a bonus during a game or after receiving recognition, or for being at the event for a certain period of time. As a result, the icon having the enlarged mass may have enhanced capabilities such as being able to push through a larger crowd or strike a game object (e.g., a virtual soccer ball) with more force.
Provide the ability to go from one room with one type of experience into another room with a different type of experience. Access to one room or the other may be restricted.
Enable one person to "take the floor" and give a speech or toast. This makes everyone else muted or quieter while the person talks, and optionally enlarges or otherwise enhances the video emanating from the speaker's camera, e.g., by increasing its size or otherwise making it more visually prominent.
Enable one person to give a live performance, such as a comedian or other performer. The performer can see the reaction of the crowd and their level of engagement.
Provide a multitude of experience modes. For example, in one mode, the audio experience and quality would be elevated, while requiring participants to use headphones to experience high fidelity sound. In another mode, the audio experience is more of a background, and the system will use echo cancellation capabilities to enable participants to participate without using headphones.
Provide several options for how the rooms render visually. For example, a participant with an old computer, slow CPU, slow bandwidth, and/or small screen may be able to see only 10 participants on the screen at a time. A participant with a very powerful machine, fast CPU, very fast bandwidth, and large screen may be able to see 50 participants at a time. These options may be automatically given to participants based on their equipment setup, or they may be selected manually.
A name tag can be displayed below each video icon. This name tag can be clicked, and then a brief pre-recorded video of a person's "elevator pitch" or background could be displayed, thus expanding knowledge of each other. Also, another button could be enabled that allows the participant to seamlessly give that person recognition via a recognition platform.
Furthermore, all these elements can be available via a web browser or application on a computer, tablet, smart phone, or any other internet connected device. A server hosts the content including the music, games, and content.
A development portal can make it possible for developers of games, hosts of events, event planners, musical talent, music providers, and other enhancers of the group experience to offer their content, games, and talents to hosts of virtual events. The host is able to purchase these products/enhancements and make them available to virtual event participants.

Upload photo or video or audio—virtual event participant can upload a photo, video, and/or audio segment to the virtual event system and selectively present one or more of them to other meeting participants.

Figure 2A:
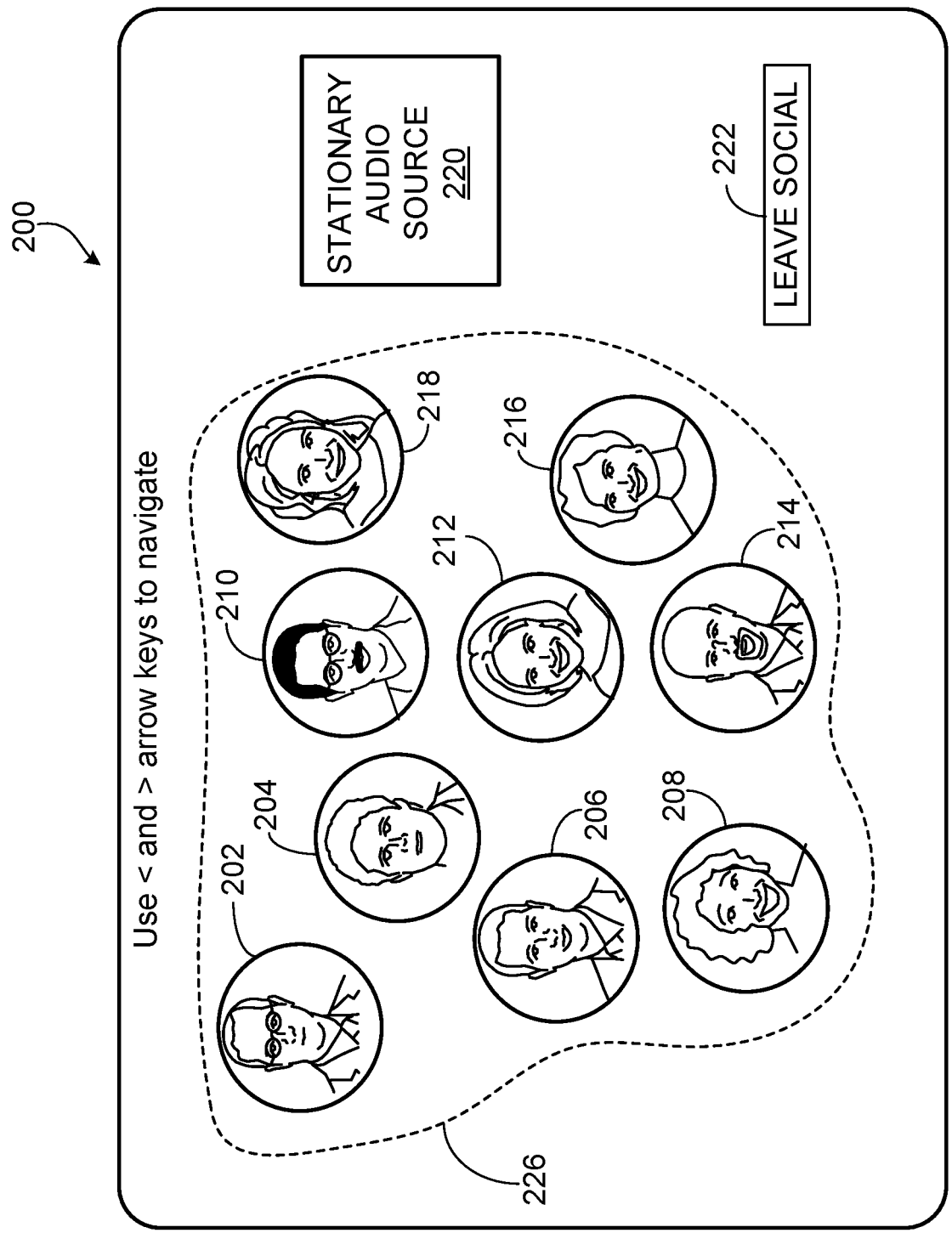
FIGS. 2A-2B illustrate successive states of a dynamic virtual environment.
Figure 2B:
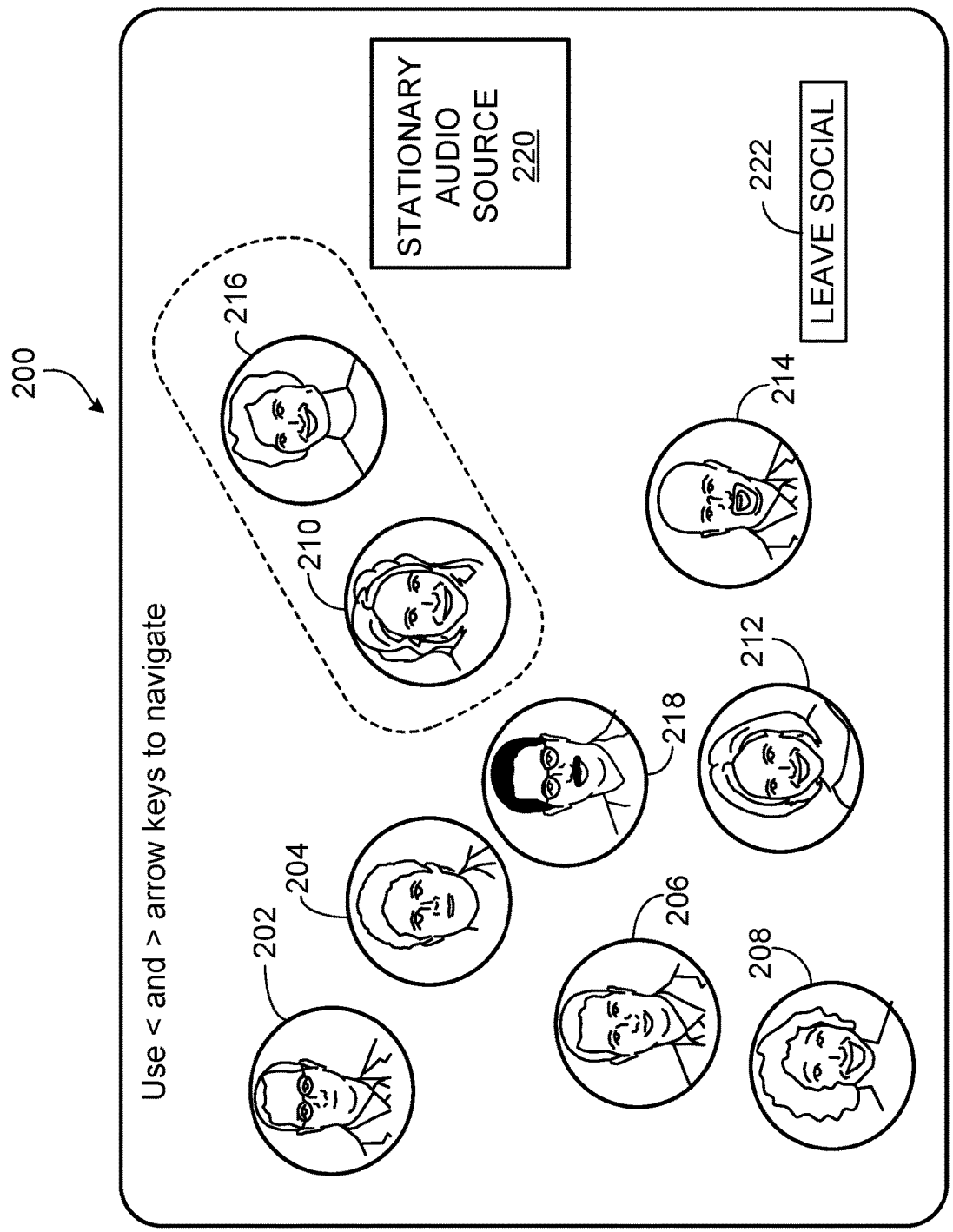

FIGS. 2A-2B depict an example of a dynamic virtual event in progress. This particular meeting includes nine participants 202-218, each represented by a separate icon that may display within the icon static or video images representative of the participant. Each participant also can emit and hear audio, for example, speech of him/herself or other participants. The nine icons in this example are displayed as being distributed in a virtual event venue 200 that includes a stationary audio source 220 at the right side of the venue 200. Each participant, via user input (e.g., the arrow keys), can move his or her icon around within the virtual venue 200 and form groups of two or more participants, similar to how actual humans can move around and pair off in a physical venue. For example, in FIG. 2A, the nine participants are essentially all clustered together in a single group, as indicated by the dashed-line shape 226. However, as shown in FIG. 2B, two of the participants 216 and 218 have moved their respective icons to form a sub-group (also referred to as an audio group) of two people, indicated by the dashed-line shape 224. As a result, the volume of the audio emitted by these two sub-group participants, because they are in a sub-group 224, will be higher as between them in contrast to the volume of the audio emitted by the other, more distant participants, which will be muted proportionally based on their respective distances from the sub-group 224 of two participants 216, 218. In other words, participants 216 and 218 will hear each other better (i.e., the volume of their emitted audio will be relatively louder) because they are closer together, while the volume of conversations of other participants farther away (e.g., participants 202 and 204) will be quieter (e.g., background chatter), if not altogether silent, or nearly so. In this manner, the virtual event venue 200 presents a dynamic environment in which the participants can move around the venue and form sub-groups to have conversations, similar to how humans at a physical gathering move around and interact at a physical meeting venue. Optionally, the existence of a sub-group 224 may be indicated visually, e.g., by displaying a line encompassing the sub-group members, or by any other suitable visual indication technique (e.g., highlighting, coloring, shading, etc.). The visual indications of a sub-group may be displayed either only to members of the sub-group, or globally, meaning to all virtual participants at the virtual event.

In a similar manner, the stationary audio source 220 will sound louder or quieter depending on how close a participant moves his or her icon to the audio source 220. For example, as shown in FIG. 2B, the audio source 220 will sound louder to participant 216 because he is closer to the audio source 220, whereas, in contrast, the audio source 220 will sound quieter to participants 202 and 208 because their icons are farther away from the audio source 220.

A participant may leave the meeting by clicking on button 222.

Further features, functions, and implementation details of dynamic virtual event venues include the following.

Another potential feature of the virtual event environment is dynamic audio grouping in which icons (e.g., video bubbles) representing two or more meeting participants come within a certain distance of each other, the proximity of their respective icons to each other is detected and used to create an audio group (or sub-group, as shown in FIG. 2B). As described above, the formation of an audio group changes the characteristics of the audio volumes that the meeting participants hear. Whereas normally volume is louder if an icon is closer and quieter if it is farther from another icon, in an audio group (e.g., sub-group 224 in FIG. 2B) all of the icon's volumes are at the same level. This enables all members of the audio group to hear each other, even if one or more of the icons are somewhat far apart (in the sense of visual distance between icons being displayed on the screen).

The audio groups may be formed or changed either manually (e.g., based on user input) or automatically/dynamically based on parameters such as the level of proximity between two or more icons, and optionally other parameters. For example, to determine if a passerby (e.g., an approaching icon representing a meeting participant) should be joined to an audio group, the approaching icon's speed, distance, and/or time spent lingering near the audio group can be taken into account. Depending on the particular parameters used to implement dynamic audio grouping (e.g., threshold speed, distance, and time spent lingering), the system makes a decision to either let the meeting participant represented by the approaching icon to pass without joining the audio group or to join them to the audio group. For example, referring to FIG. 2B, if icons 204, 206, and 210 already have been joined into an audio group, and icon 218 is moving to the left, and thus approaching the audio group, a decision is made to either join icon 218 to the audio group or decline to join icon to the audio depending, e.g., on the speed of icon 218, its screen distance from the audio group, and/or the time spent lingering (if any) near the audio group. Other parameters can be used in making the join/no join decision depending on the preferences of the implementer of the virtual event environment. This same technique may be used either to form an audio group in the first instance, or in deciding whether to join a meeting participant to an existing audio group. Additionally, as described above, visual indicators may be used to signal the existence of an audio group. Further, such a visual indicator (e.g., a line encompassing all members of the audio group) may change appearance, either if a member of the audio group moves around (e.g., the visual indicator will dynamically change shape in a "rubberband" manner to continue to encompass all group members as they move their icons within the virtual event environment) and/or when virtual participants enter or leave the audio group).

Alternatively, or in addition, the virtual event environment can automatically move icons within an audio group, e.g., such that the icons of the group's members are visually centered around a virtual center-of-mass, which tends to optimize the number of participant's that can be displayed properly. Whenever participants enter or leave an audio group, the virtual event environment causes the icons of the current audio group to automatically re-center themselves about the current center-of-mass, which changes as icons enter and leave the audio group. Optionally, centering icons within an audio group can have a time-delay feature such that the icons are moved to re-center them only after a predetermined period of time (e.g., 3 seconds) has lapsed and the audio group's icons have stabilized. This time-delay helps to prevent excessive and repetitive re-centering when participants come and go repeatedly within a short time.

The number of icons (i.e., event participants) allowed within any individual audio group can be limited to a maximum quantity (e.g., 10). The feature is useful, among other ways, to limit the size of audio groups to a manageable number of participants, which tends to enhance the ability of individual participants in the audio group to speak to any other member (or members) of the same audio group, thereby improving the social effectiveness of the virtual event environment. In addition, the virtual event environment optionally may provide an exclusionary feature in which, for example, the host or other member of an audio group can select (e.g., through user-interface controls) to prevent other participants from joining their audio group, either on a global basis (i.e., no other participants are allowed to join the audio group) or on a selective basis (i.e., only certain participants are prevented from joining the audio group). Such an exclusionary feature may prove beneficial, e.g., while an audio group is having a confidential or otherwise private conversation.

Further, in addition to the sound dynamics, the virtual event environment can be configured to center the audio group's video bubbles (i.e., icons in a circular shape that display video or a still image representing the respective meeting participants) so all members of the audio group can view each other in an optimal manner.

Figure 3:
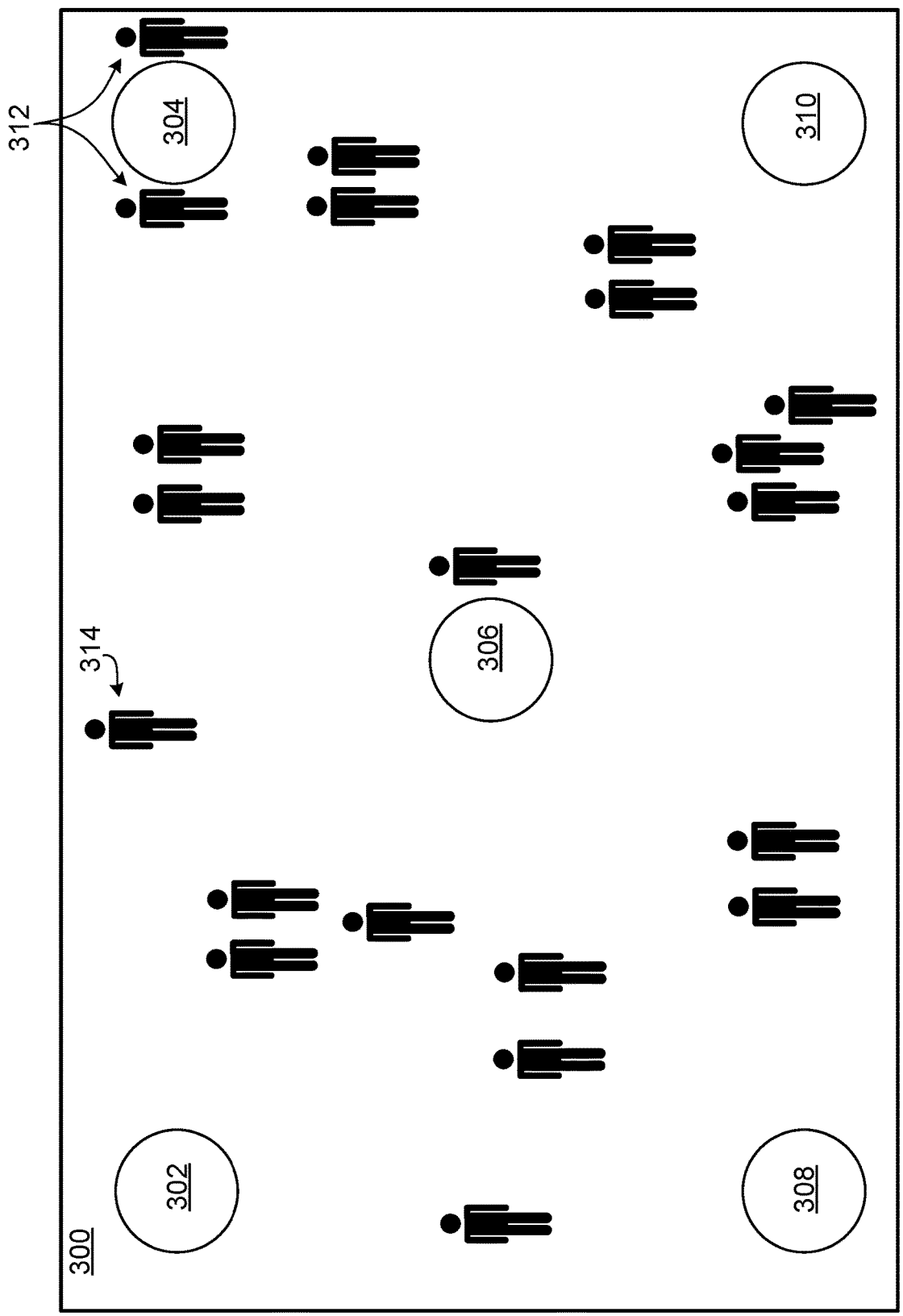
FIG. 3 illustrates a physical meeting space that includes kiosks to allow participants in the physical meeting space to interact with virtual participants.

The virtual event environment also may enable hybrid physical/virtual interactions between meeting participants. For example, as shown in FIG. 3, a meeting or conference can include both a physical aspect (e.g., in-person individuals joining together in the same physical space 300) and a virtual aspect, that is, meeting participants who are geographically separated by distances that prevent them from seeing or hearing other participants without the aid of electronic or similar means, can nevertheless participate virtually in the meeting (e.g., see and hear other participants) using various electronic means such as cameras, microphones, display screens, internet connectivity, or the like. For example, in the physical space 300 at which a meeting or conference is being held, one or more kiosks 302, 304, 306, 308, 310, each including a display screen, camera, and microphone, and connected to the internet or other communications network, can be placed at appropriate locations in the physical meeting space 300 such that the physical meeting participants can socialize or otherwise interact (e.g., hear and see) with virtual event participants via the kiosks. More specifically, the display screen on a kiosk can display the dynamic virtual event environment described above, and a physical meeting attendee can use the kiosk to join the virtual event and optionally have all or some of the same functionality and features provided by the virtual event environment. For example, physical participants 312 are adjacent a kiosk 304, thereby giving them access to the virtual event environment so that they can virtually interact with virtual event participants. In contrast, physical participants such as participant 314 are not sufficiently near any kiosk meaning that they cannot interact with virtual event participants.

The virtual dynamic meeting environment may also make use of metadata—for example, data about individuals (e.g., demographic information and/or information specific to an individual such as personal interests, company of employment, state/city of residence, social status, or the like). The metadata may include information users enter themselves, such as facts about themselves, or even intentions or goals to achieve during the virtual event. For example, a virtual event participant may provide information indicating that they want to make sure to interact with vice presidents, or other decision makers, of four different companies during the virtual event. The system can use such metadata to highlight or otherwise identify other meeting participants that the user having the stated goal should seek out and converse with them. Alternatively, or in addition, the system can provide a user with recommendations as to direction, things to say to other participants, suggestions for conversation starters, and the like.

Another potential feature of the virtual event environment is to regulate audio dynamics between a performer (or presenter) and the crowd (e.g., some or all of the other meeting participants). For example, in a default mode, all participants may speak (or emit other audio) at any time (e.g., simultaneously) and that audio can be heard by all other participants at different volumes based, for example, on the relative and respective distances between the participants' icons within the virtual meeting environment. However, that default mode can be modified to enable certain entities to regulate the audio dynamics such that regulating audio based on distance between icons may be modified or over-ridden entirely. For example, when one of the meeting participants is a performer (e.g., comedian, singer, poet, speaker, etc.) and that performer gives a live performance virtually (e.g., if the performer participant is a comedian and is doing their comedy routine), the system can allow real-time (or near real-time) crowd feedback. In that regard, any of several dynamic audio control modes for either or both the performer and the crowd can be employed.

For example, the performer or presenter (or another on their behalf) can selectively quiet the crowd, either the entire crowd or specific members of the crowd. For example, if one or more participants are actively talking (or generating other audio) and the presenter (or other entity authorized to regulate the audio dynamics) decides that the talking is disruptive of the presentation, the presenter can, using user interface controls, selectively quiet the talking crowd members, either by reducing their volume (potentially on a per-participant or per-group basis) or by silencing their volume entirely. Such reducing or silencing may be configured to allow members of a particular talking participant's audio crowd to continue to hear the talking participant's audio but no other participant (and/or presenter) will hear that talking, either at all or on a reduced basis.

Alternatively, or in addition, such crowd quieting may be performed automatically by the virtual event system, for example, by detecting talking or other audio emanating from sources other than the presenter that exceeds a predetermined threshold. Any such audio that exceeds the threshold can be reduced in magnitude (i.e., the volume is lowered and thus harder to hear by the other participants and/or presenter), or muted entirely.

Alternatively, or in addition, quieting the crowd can be regulated such that short and potentially loud spikes of audio (e.g., desirable but loud audio such as audience laughter or cheering) are permitted to continue but audio that exceeds either or both of a time duration or decibel level) can selectively be reduced or muted entirely, as described above.

As another example, the presenter or performer (or another on their behalf) can select "unrestricted audience participation" where all noise from the crowd streams to them (and potentially other participants), regardless of its relevance, similar to how all noise, both from the performer and the crowd, emanates throughout a physical venue during a punk rock concert or similar performance. The performer alternatively can select "no audience participation," where the audience must listen and cannot converse during the show, e.g., because all but the performer's microphone are muted.

Alternatively, or in addition, a "push-to-talk" ("PTT") mode can be employed, where, for example, a member of the audience (i.e., a virtual event participant who is not the performer) can give shout outs or ask questions, but only if they first press a button (e.g., a virtual button displayed within the user interface) to do so, and the presenter affirmatively gives them authorization to speak (e.g., by using user interface controls). Such PTT requests can be queued up either on a first-in-first-out basis or potentially on some other basis such as a characteristic or other parameter associated with the PTT requester, e.g., the requester's rank or title within the company, whether the PTT requester has previously and/or recently made another PTT request, or the like. For example, if the president of a company concludes a virtual presentation to the company's employees, and then asks for questions, and, in response, an audience member makes a PTT request to ask a question or make a comment, that PTT request will be added to the queue and selectively granted, e.g., in turn. When that PTT request is granted, the audio emanating from the PTT requester (e.g., speech) is turned on (and potentially increased in volume) so that all of the other participants listening to the president's presentation will be able to hear the PTT requester's question or comment. At the same time, the audio emanating from every other participant (or other audio source) will be muted (e.g., silenced or reduced) so that the other listening participants can hear the PTT requester's comment or question. In addition, video emanating from the PTT requester, while asking their question, can be made larger or otherwise enhanced to draw the attention of the audience and/or presenter.

This process of turning on the audio emanating from the current PTT requester and muting the audio emanating from all other sources (except, potentially, from the president, moderator, or other individual given such privileges) results in an orderly and manageable queue in which questions or comments are made audible one at a time.

Alternatively, or in addition, the PTT requests could be moderated, e.g., to identify unacceptable or impermissible content. For example, in moderation mode, each PTT requester would be required to first speak (or otherwise communicate) their comment or question (which could be record and queued), which would then be screened by a moderator (e.g., by a human being or automatically using keyword filtering, predetermined rules, or artificial intelligence) before the PTT request was granted. The moderator could screen the comments or questions either by listening to the recorded message from the PTT requester, or optionally the recorded message could be transcribed (e.g., using automated voice-to-text conversion) so that it could be read by the moderator. Objectionable comments or questions would selectively not be presented to the presenter and/or the audience participants. If the PTT request is granted, the recorded question or comment would then be played for everyone to hear. Alternatively, the moderator could choose to allow the PTT requester to speak live and present their question or comment again, rather than playing the recorded comment or question.

Alternatively, or in addition, the virtual event system could employ a layered crowd-feedback approach (potentially in conjunction with the PTT mode) in which only the audio emanating from a subset of participants (e.g., 20) in the total audience (e.g., 400) is audible to other participants. This approach has several benefits, for example, it reduces the bandwidth required by the system in that only 20 audio streams need to be supported at a time, rather than all 400. Such layering could be implemented on a group-specific basis in which the audio emanating from participants in only a certain number of groups (e.g., one) would be make audible at a time, and then, potentially on a time duration basis, only the audio emanating from a different one or more groups would be made audible. This approach would give the participants (and/or the presenter) the sense of live, natural crowd noise, while at the same time reducing bandwidth requirements. The groups used in the layering approach could either be previously formed audio groups and/or groups arbitrarily defined by the virtual system (e.g., randomly or based on proximity of participants' icons). In addition, the groups could overlapping membership (e.g., one or more participants in the currently audible group also are members of the next group of participants to be made audible). This technique would tend to improve the realism produced by the layering approach, e.g., by giving both the audience and the presenter the impression that the audience is attentive and being responsive (e.g., laughing at jokes). Optionally, the performer or their proxy can screen the audience member and/or their intended audio output, before enabling the audience member's microphone.

Similarly, the virtual system can reduce required bandwidth, and potentially produce other benefits, by limiting the quantity of video streams emanating from the participants (and displayed within their icon) for display. For example, while a PTT requester is speaking, their streaming video would be displayed, and potentially enhanced (e.g., in size or visual effect). In contrast, for participants who are behaving in an undesirable or otherwise less than ideal manner (e.g., inattentive, speaking too loud, asleep or inactive, doing something inappropriate, etc.), their video streams will not be displayed in the virtual event environment but rather in a low-bandwidth manner (e.g., only a static display of the participant's image or name). Similarly, the virtual event system can choose to selectively display the video streams of only certain participants, e.g., randomly selected potentially on a rolling basis, or depending on predetermined criteria such as position within the company hosting the virtual event, status as a preferred customer, celebrity, or recognized expertise and achievement in a certain discipline, and/or essentially any other criterion deemed by the event host to be worthy of special treatment.

As another example, the presenter can select "King of the World" mode (perhaps suitable for webinars or presentations from the CEO of an organization) in which the presenter can view all participants, stop them from talking to each other, and/or turn off their video stream, or otherwise prompt them listen to the presenter's presentation.

Additionally, one or more virtual participants can quiet or silence the presenter (or potentially any other participant, either individually, or on an audio-group basis). For example, if two or more participants are in an audio group, and they are not interested in hearing the presenter (and/or other participants), either of them can selectively silence or quiet (reduce volume) the audio of others, including audio emanating from the presenter, other individual participants, and/or entire audio groups.

Optionally, the virtual event system can determine, for example, whether or not an audience participant is actually watching or otherwise paying attention to the performance, and then use that information to undertake certain actions such as muting the microphone of the inattentive audience participant, sending that participant a message such as "pay attention," or essentially any other appropriate action as desired. For example, if the audience participant is determined to be speaking or otherwise interacting with another virtual participant of the audience during the performance in an ongoing manner (e.g., continually speaking with the other audience participant for more than a threshold period of time), then the audio emanating that audience participant could be blocked, either entirely (such that the inattentive audience participant cannot speak with any of the other participants, except potentially only participants in the inattentive participant's audio group) or selectively, e.g., the audio emanating from the inattentive audience participant is turned off or otherwise blocked such that only certain participants (e.g., the performer) cannot hear it.

As another example, if a participant is determined to be inattentive, e.g., because they have quieted or muted the presenter beyond a predetermined duration, then that inattentive participant will be denied access to certain features or content, e.g., then the video emanating from that inattentive participant's camera will not be displayed in the virtual event environment. In contrast, if a participant is, for example, watching the presentation in full-screen mode, the system may determine that that participant is active and no features or content will be disabled for that attentive participant, e.g., the video emanating the attentive participant will potentially be displayed in the virtual event environment.

As another example, the system could analyze images obtained from the audience participant's video stream (e.g., captured by the participant's local camera and transmitted to the computing platform hosting the dynamic virtual event environment) and use image analysis to determine whether or not the participant's eyes are directed to their local display screen. If, for example, it is determined that the participant's gaze is elsewhere than their display screen for a threshold duration, then the system could infer that the audience participant in question is inattentive, and in response undertake essentially any other appropriate action as desired such as muting their audio or not displaying their video stream.

As another feature, the virtual event system can measure, potentially in an ongoing and real-time manner, the level, extent and/or effectiveness of a meeting participant's social activity (i.e., the interactions between the meeting participant being measured and other meeting participants during a virtual event). The system can use this information on a real-time basis, for example, to inform a meeting participant who is a salesperson how effectively they are networking, or have networked, with other participants of the virtual crowd. For example, using metadata and/or other collected information, the system could inform the sales person that they have interacted with (and for how long) decision-makers of companies in the salesperson's relevant industry.

As another example, an organization planning a virtual event can gather information, e.g., metadata, on each of the potential virtual participants, e.g., name, title, industry, past recognitions or achievements (e.g., best IT Manager of the year, MacArthur Award Winner, designation as Fellow at a prestigious organization, VIP, etc.), related relationships with other people or enterprises, an indicator of the quality of relationship between each participant and the organization planner (e.g., a color-code such as green (good relationship), yellow (neutral relationship), red (bad or troubled relationship)), and similar information. That metadata can then be provided to the organizational planner as a searchable attendee list that can be used to plan activities and identify relevant relationships between various participants. In addition, the metadata may be selectively displayed to event participants in or along with a participant's icon, e.g., using various graphical attributes such as color-coding. For example, an event participant, if authorized, may be able to search or otherwise access the metadata on a real-time basis, e.g., to identify all participant attendees who work for a specific company, occupy a certain position within a company (e.g., CEO), attended a specific school, are interested in certain hobbies, sports or literature, or the like. Such information could be displayed, e.g., using either a hover-over mode (which would cause the display of a frame of information) or by clicking on the participant's icon, or essentially any other suitable user-interface technique. The selective display of metadata may be controlled on a per-participant basis, e.g., only to certain employees of the planning organization, to inform specific participants of desirable interactions with other, non-employee participants.

In addition, the system can give the salesperson (or any other participant) real-time prompts to suggest interactions based, for example, on the salesperson's stated intentions, best practices, and/or using metrics and other information collected by the system over time. For example, the system could notify the salesperson (e.g., displaying a pop-up message or the like on the salesperson's display screen) that a relevant decision-maker is present in the virtual event environment and that the salesperson should use their user interface controls to navigate their icon to the current virtual location of that decision-maker's icon (e.g., "move to the left and up" or "keep moving left—you're getting close").

In addition to salespersons, the system can be used to measure social interactivity and/or give social prompts to essentially any type of virtual event participant. For example, the system can inform a recruiter how many potential recruits they have interacted with, information about those potential recruits, the presence and locations of other recruits with which the recruiter has not yet interacted, and/or the effectiveness of the recruiter's interactions with the potential recruits (e.g., by measuring the recruits' attentiveness during the interaction, as described above).

Additionally, the system can collect relevant information and provide a post-virtual event report, for example, to a manager so that manager can be better informed about the quantity, quality, and/or effectiveness of their employees who participated in the virtual event. Similar, the system can provide a post-virtual event report to the event's host so that the host can be better informed about the quantity and type of interactions that occurred during the virtual event, and/or the virtual event's effectiveness relative to the event host's goals.

As discussed above, the dynamic virtual event system can provide games such as "bubble soccer." For example, each participant's icon is in the shape of a "bubble," and the willing participants are divided into teams of one or more participants. Then, a movable graphical object (e.g., a virtual soccer ball) is introduced into the environment and the teams attempt to score virtual goals by manipulating their user-interface controls to virtually bump into the virtual soccer ball, thereby imparting a virtual force, in an attempt to cause the virtual soccer ball to move toward and/or enter the opposing team's virtual goal (e.g., a static graphical object in the form of a soccer goal and displayed on each game participant's screen). Other potential games may include "group pong," which may be similar to bubble soccer in that a team of virtual participants manipulate their video bubbles to come into virtual contact with a displayed, movable graphical object in the form of a ball or the like, and attempt it to bounce back toward a virtual wall, similar to the familiar Pong videogame.

To facilitate such games, the dynamic virtual event system can provide a framework for game and other activity developers so that the developers can build their games on top of the virtual social environment. To do so, the game developers could use known software tools, for example, to display a specific screen layout and format (e.g., a virtual soccer field), expose player positions, name, and/or controls, place virtual objects into the virtual social environment and apply known rules of physics to the virtual objects, and/or respond to inputs from players.

As another feature, the virtual event system can be configured to have multiple (e.g., two or more) different virtual event spaces, which can be linked or otherwise connected to enable virtual participants to move from room to room. Each virtual room may be occupied by different virtual participants, so by moving into a different virtual room, a virtual participant can gain access to a different group of virtual participants with which to interact. This feature may be useful, among other ways, to reduce the size of the group of virtual participants in any particular virtual room down to a manageable number, thereby enhancing the effectiveness and accessibility of interactions, which tends to improve the overall virtual event experience.

As another feature, a virtual participant may share their screen with other virtual participants, either on a global basis (i.e., all virtual event participants) or on a group-specific basis (e.g., only to other members of the sharing participant's audio or sub-group). Among other uses, screen sharing may be used to share audio, video, still images, software applications, virtual whiteboards, URLs, or the like. In addition, a member of the group (e.g., the group host or owner, which may be designated either manually, e.g., based on user input, or automatically, e.g., the first virtual participant in the group (e.g., the initiator of the group)) may control whether screen-sharing is global or limited to the group. Such control may be implemented, e.g., using rules such as whether the group's activities are directed at corporate training, directed to fun activities As another feature, the virtual event environment may be configured to enable virtual participants to place artifacts or graphical objects within the virtual event environment, either on a global basis or on a group-specific basis. For example, a virtual event participant, who is enabled to do so, may place graphical objects such as a form to be filled out, a display frame (that displays, e.g., a URL, software code, an iFrame, or other information), a virtual photo-booth, a virtual whiteboard, or a picture with a hover-over mode, a CTA (Call-To-Action) button, or the like.

As another feature, the virtual event environment may be commerce-enabled, e.g., to facilitate sales events, trade shows, or the like. For example, suppose that a virtual participant is a jewelry salesperson and has a number of high-priced jewelry items to sale, the salesperson may place graphical objects (e.g., photos, videos or 3D models) in the virtual environment (e.g., in a separate dedicated virtual room) representative of the jewelry items, which other participants (i.e., potential buyers) can inspect and determine whether they want to purchase one of more of them. Each jewelry object can be enabled with various functionalities (e.g., hover-over informational frames, URLs to relevant webpages or other internet-accessible resources, or the like). Both the virtual potential buyer participants and the salesperson can move around the virtual dedicated room as desired and inspect the various jewelry items for sale. In addition, one or more other participants associated with the jewelry items (e.g., the designer, a celebrity endorser or other spokesperson associated with the jewelry items) can move around the virtual dedicated room and interact with the potential buyers to help bolster sales, answer questions, and the like.

As another feature, the virtual event system may provide a developer framework that enables a wide variety of people, e.g., game developers, corporate trainers, event planners, and the like, to develop resources or other activities (e.g., games, questionnaires, online courses, tutorials, team building events, structured meetings, etc.) that can be deployed in the virtual event environment. In addition, the developer framework could include an event macro layer that enables developers and others to develop macros, or templates, for certain types of events, e.g., scout troop meetings, diversity or other corporate training, negotiation training, etc. Such macros would provide a track-proven, general framework, developed by professionals based on established best practices, and for use by others, who could populate an instance of a selected framework with information and other content specific to the particular event that they are planning, thereby enabling a repeatable way for a developer to quickly and easily plan and run a specific event that is well-structured and engaging for the event participants. The macros could be uploaded to the virtual event system, and/or an appropriate internet venue such as an online marketplace, and could be shared, traded or otherwise made available to others for use. In a marketplace environment, the uploaded macros could have, e.g., well-developed and creative backgrounds, custom themes, and/or other content or functionality designed by professionals and proven to be effective or otherwise attractive to use. Users could visit the marketplace and download, potentially at a cost, desired macros that are relevant to their event being planned.

For example, if an event planner wants to plan a virtual event relating to team building, the planner could visit the marketplace and peruse the various macros available for team building exercises, which, for example, could vary based on specific industries, countries or languages, knowledge level of intended audience, or the like. The selected macro could provide a framework (e.g., present agenda, invite a guest to give an introductory speech, play a specified video, execute a certain activity, etc.) that prompts the planner to enter content specific to their event. In that manner, the planner is provided with a proven, plug-and-play template into which the planner enters their event-specific content, which then can be executed on demand, for example, during a virtual event.

Figure 4:
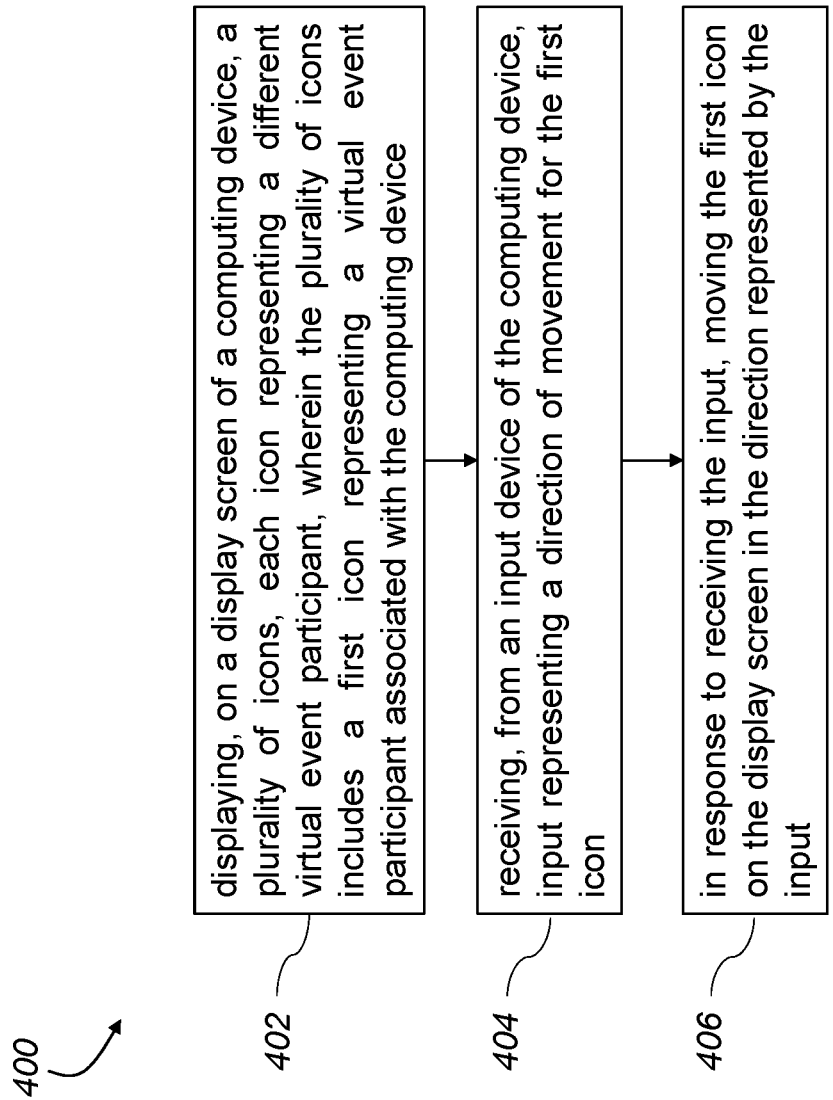
FIG. 4 illustrates an exemplary process for conducting a virtual event.

FIG. 4 illustrates an exemplary process 400 for conducting a dynamic virtual event. At 402, a plurality of icons are displayed on a display screen of a computing device, each icon representing a different virtual event participant, wherein the plurality of icons includes a first icon representing a virtual event participant associated with the computing device. At 404, input representing a direction of movement for the first icon is received from an input device of the computing device. At 406, in response to receiving the input, the first icon is moved on the display screen in the direction represented by the input.

In some implementations, the first icon comprises video of the virtual event participant associated with the computing device.

In some cases, the process 400 further comprises receiving, by the computing device, audio signals associated with a second icon of the plurality of icons; and playing, by the computing device, the received audio signals at a particular volume based on a distance between the first icon and the second icon on the display screen.

In some implementations, the particular volume decreases as the distance between the first icon and the second icon on the display screen increases.

In some cases, the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

In some implementations, the process 400 further comprises receiving, by the computing device, a plurality of audio signals each associated with one of the plurality of icons; and playing, by the computing device, each of the received plurality of audio signals at a particular volume based on the distance between the first icon and the icon associated with the received audio signal on the display screen.

In some cases, the process 400 further comprises receiving, by the computing device, input designating a particular icon from the plurality of icons upon which to focus; and in response to the input, playing, by the computing device, audio signals associated with the particular icon at a first volume level, and playing audio signals associated with icons other than the particular icon at a second volume level, wherein the first volume level is greater than the second volume level.

Figure 5:
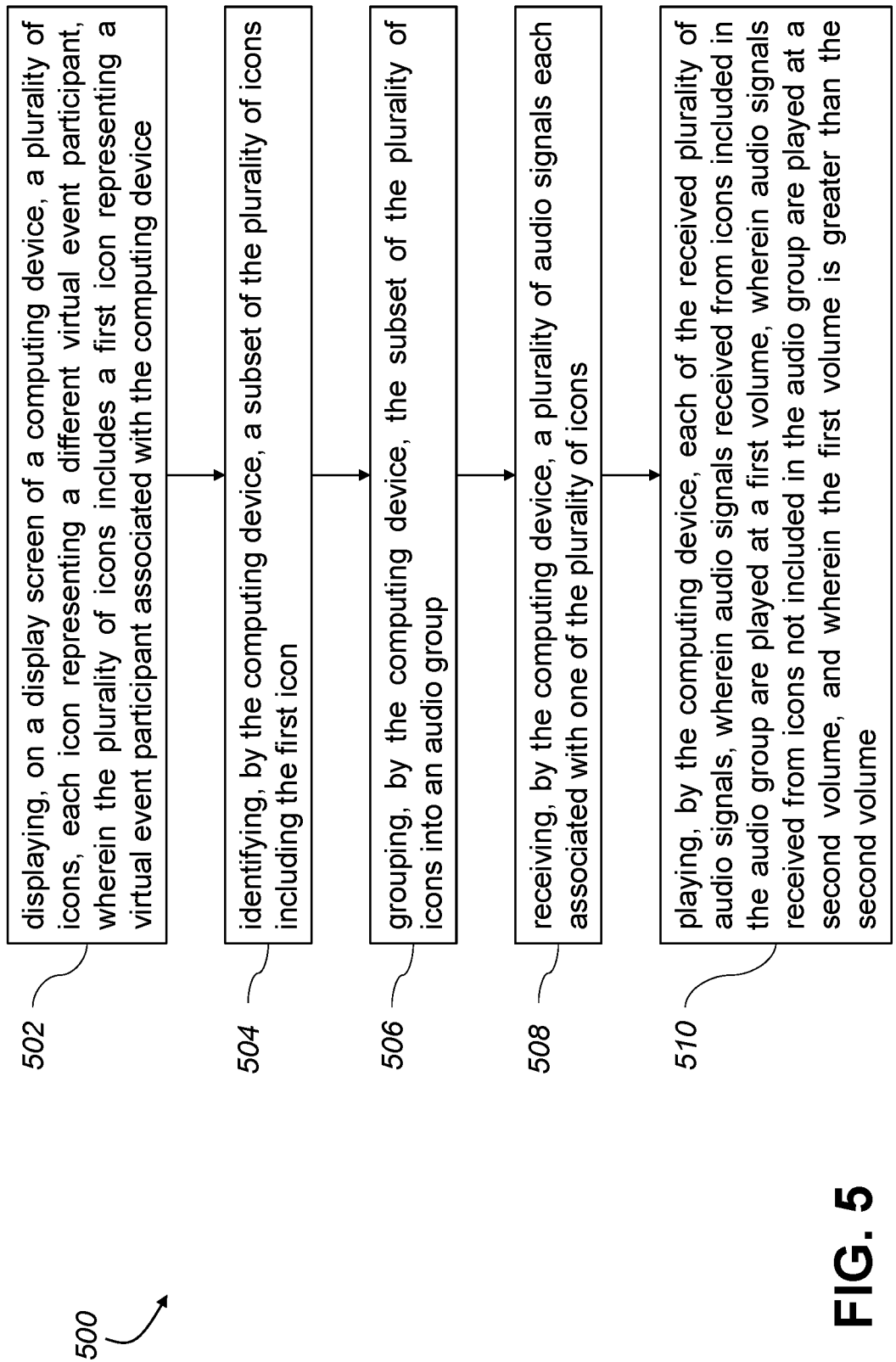
FIG. 5 illustrates an exemplary process for conducting a virtual event.

FIG. 5 illustrates an exemplary process 500 for conducting a virtual event. As shown, the process 500 includes displaying, on a display screen of a computing device, a plurality of icons, each icon representing a different virtual event participant, wherein the plurality of icons includes a first icon representing a virtual event participant associated with the computing device (502); identifying, by the computing device, a subset of the plurality of icons including the first icon (504); grouping, by the computing device, the subset of the plurality of icons into an audio group (506); receiving, by the computing device, a plurality of audio signals each associated with one of the plurality of icons (508); and playing, by the computing device, each of the received plurality of audio signals, wherein audio signals received from icons included in the audio group are played at a first volume, wherein audio signals received from icons not included in the audio group are played at a second volume, and wherein the first volume is greater than the second volume (510).

In some implementations, identifying the subset of the plurality of icons includes identifying icons that are located within a certain distance of each other.

In some cases, identifying the subset of the plurality of icons includes receiving user input identifying the icons.

In some implementations, the process 500 includes identifying, by the computing device, an icon from the plurality of icons that is not included within the audio group; and in response, adding, by the computing device, the identified icon to the audio group.

In some implementations, identifying the icon from the plurality of icons that is not included within the audio group includes identifying the icon based on the icon's proximity to the audio group.

In some cases, identifying the icon from the plurality of icons that is not included within the audio group includes identifying the icon based on a speed at which the icon is approaching a location of the audio group on the display screen.

In some implementations, identifying the icon from the plurality of icons that is not included within the audio group includes identifying the icon based on an amount of time the icon has spent within a particular distance from a location of the audio group on the display screen.

In some cases, identifying the icon from the plurality of icons that is not included within the audio group includes receiving user input identifying the icon.

In some implementations, the process 500 includes displaying, on the display screen, a visual indication of which icons from the plurality of icons are included in the audio group.

Figure 6:
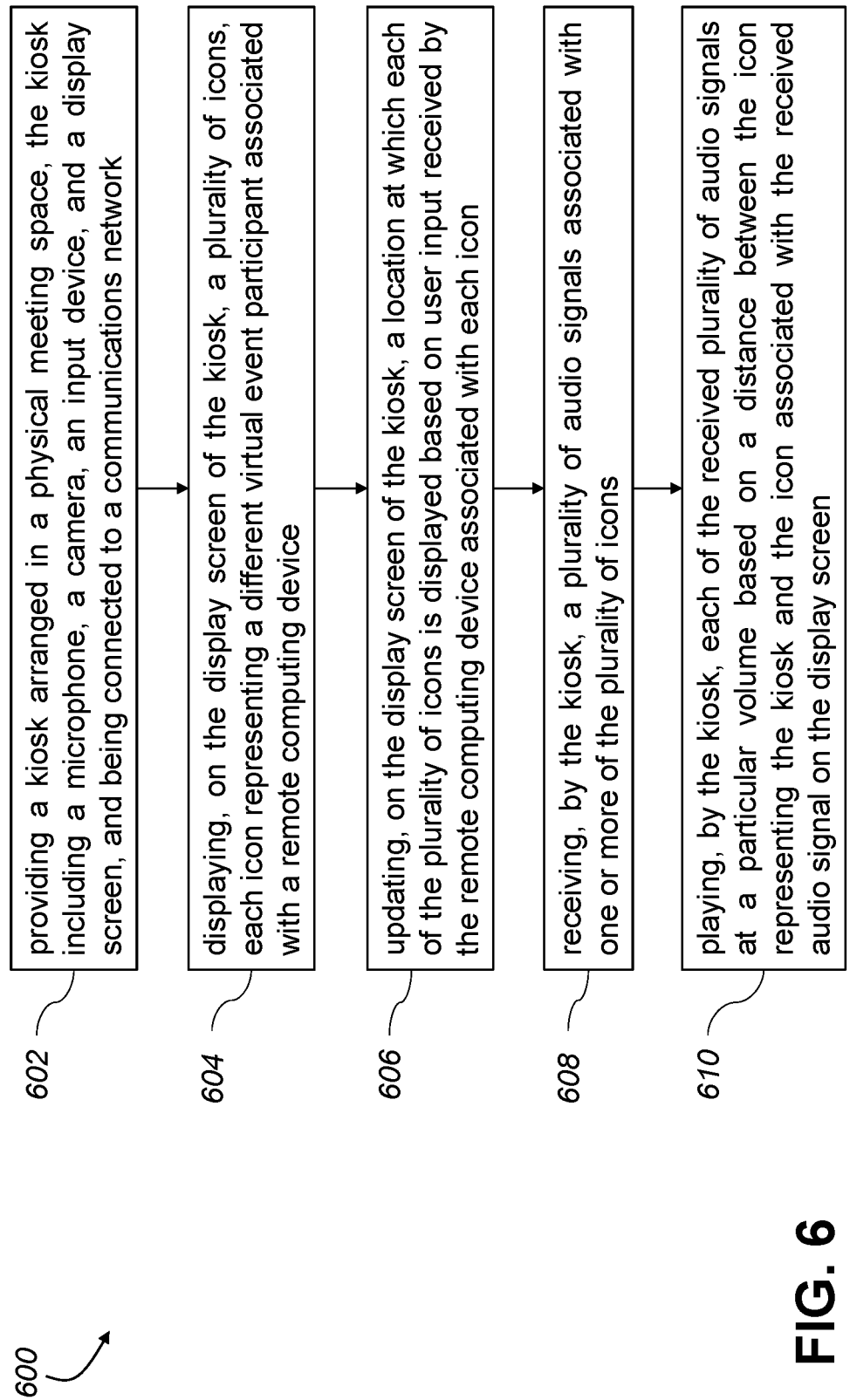
FIG. 6 illustrates an exemplary process for conducting a hybrid physical and virtual event.

FIG. 6 illustrates an exemplary process 600 for conducting a hybrid physical and virtual event. As shown, the process 600 includes providing a kiosk arranged in a physical meeting space, the kiosk including a microphone, a camera, an input device, and a display screen, and being connected to a communications network (602); displaying, on the display screen of the kiosk, a plurality of icons, each icon representing a different virtual event participant associated with a remote computing device (604); updating, on the display screen of the kiosk, a location at which each of the plurality of icons is displayed based on user input received by the remote computing device associated with each icon (606); receiving, by the kiosk, a plurality of audio signals associated with one or more of the plurality of icons (608); and playing, by the kiosk, each of the received plurality of audio signals at a particular volume based on a distance between the icon representing the kiosk and the icon associated with the received audio signal on the display screen (610).

Figure 7:
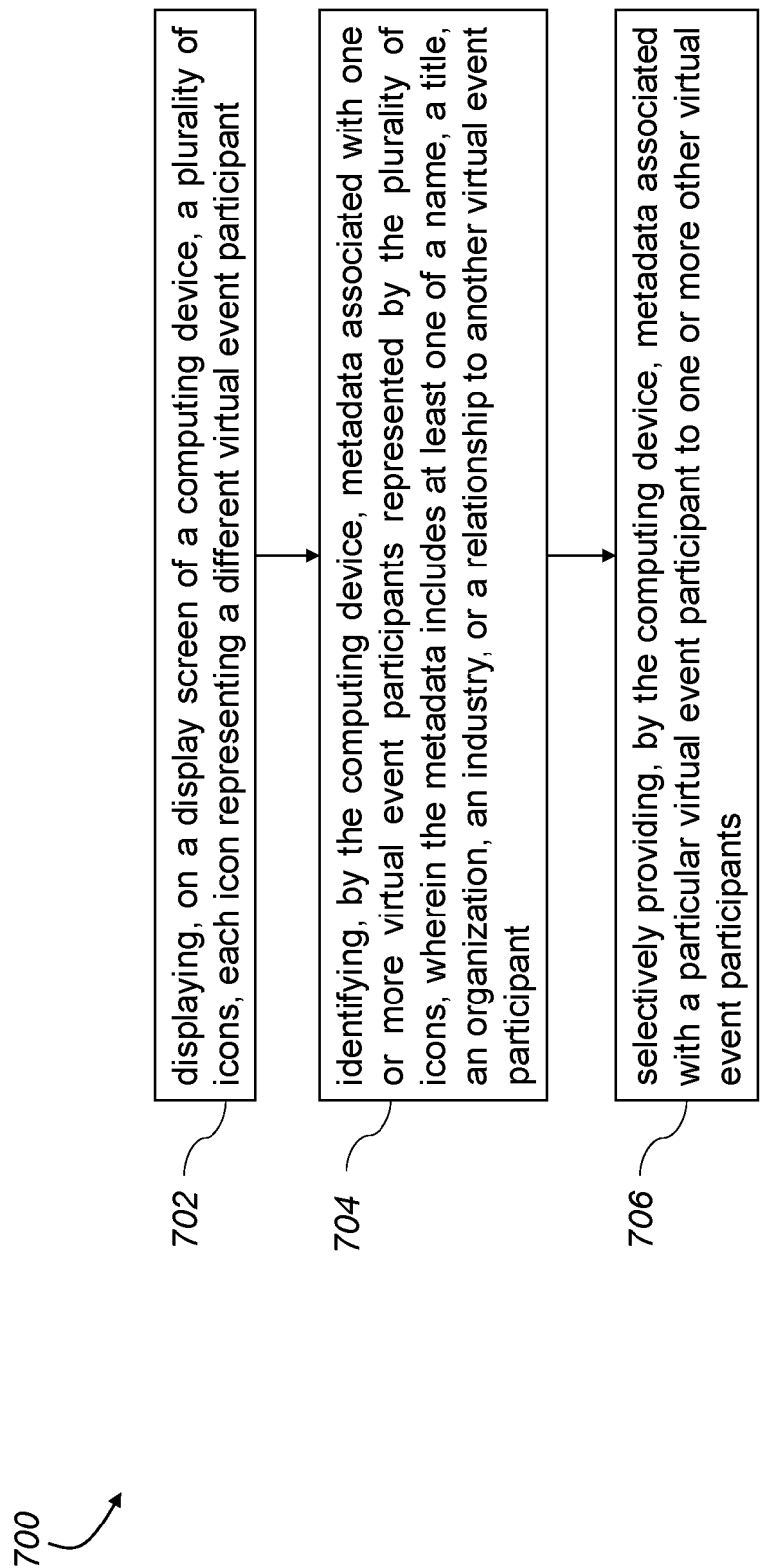
FIG. 7 illustrates an exemplary process for selectively providing metadata to virtual event participants.

FIG. 7 illustrates an exemplary process 700 for selectively providing metadata to virtual event participants. As shown, the process 700 includes displaying, on a display screen of a computing device, a plurality of icons, each icon representing a different virtual event participant (702); identifying, by the computing device, metadata associated with one or more virtual event participants represented by the plurality of icons, wherein the metadata includes at least one of a name, a title, an organization, an industry, or a relationship to another virtual event participant (704); and selectively providing, by the computing device, metadata associated with a particular virtual event participant to one or more other virtual event participants (706).

Figure 8:
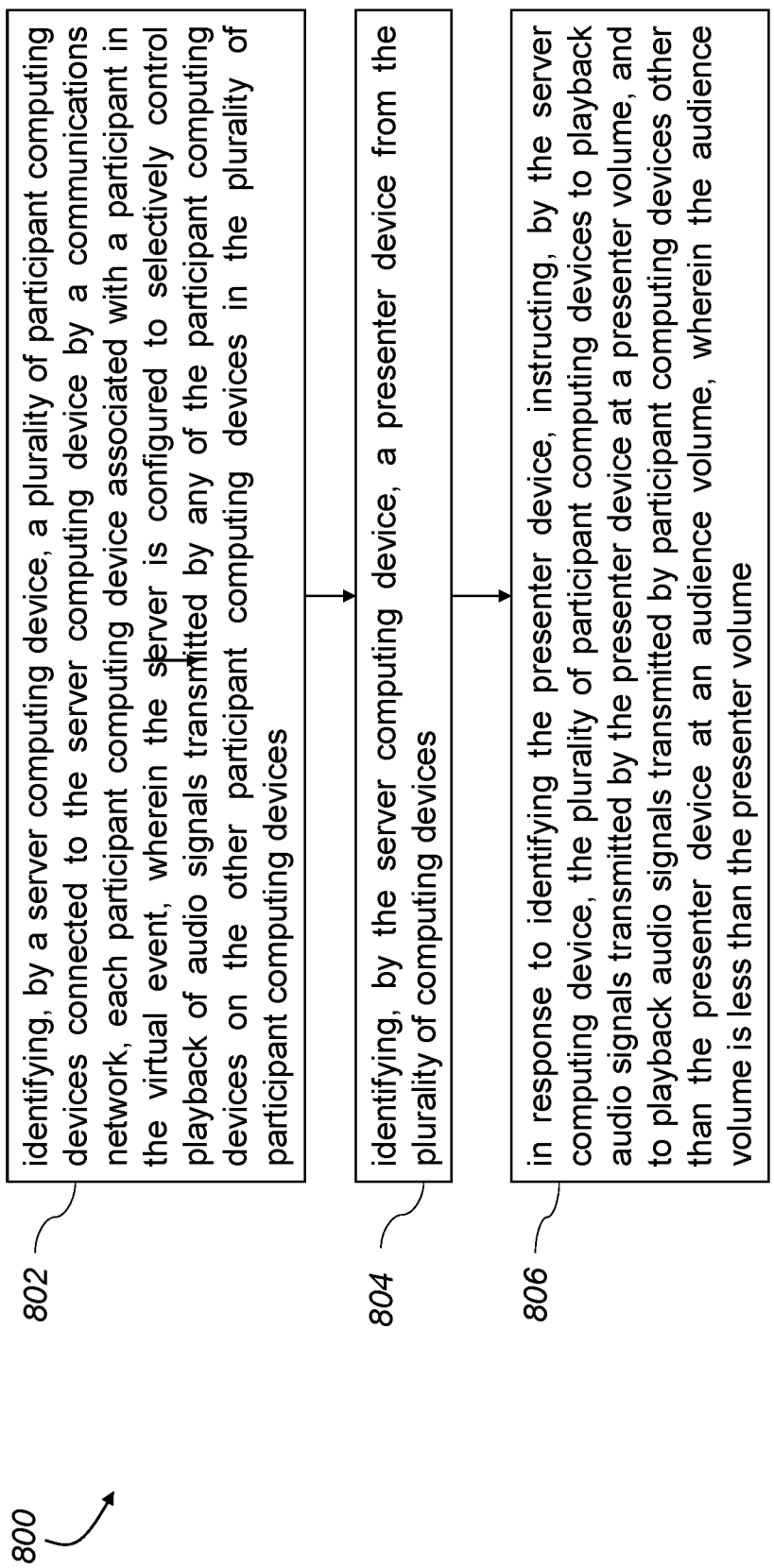
FIG. 8 illustrates an exemplary process for controlling participant audio volume during a virtual event.

FIG. 8 illustrates an exemplary process 800 for controlling participant audio volume during a virtual event. As shown, the process 800 includes identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices (802); identifying, by the server computing device, a presenter device from the plurality of computing devices (804); and in response to identifying the presenter device, instructing, by the server computing device, the plurality of participant computing devices to playback audio signals transmitted by the presenter device at a presenter volume, and to playback audio signals transmitted by participant computing devices other than the presenter device at an audience volume, wherein the audience volume is less than the presenter volume (806).

Figure 9:
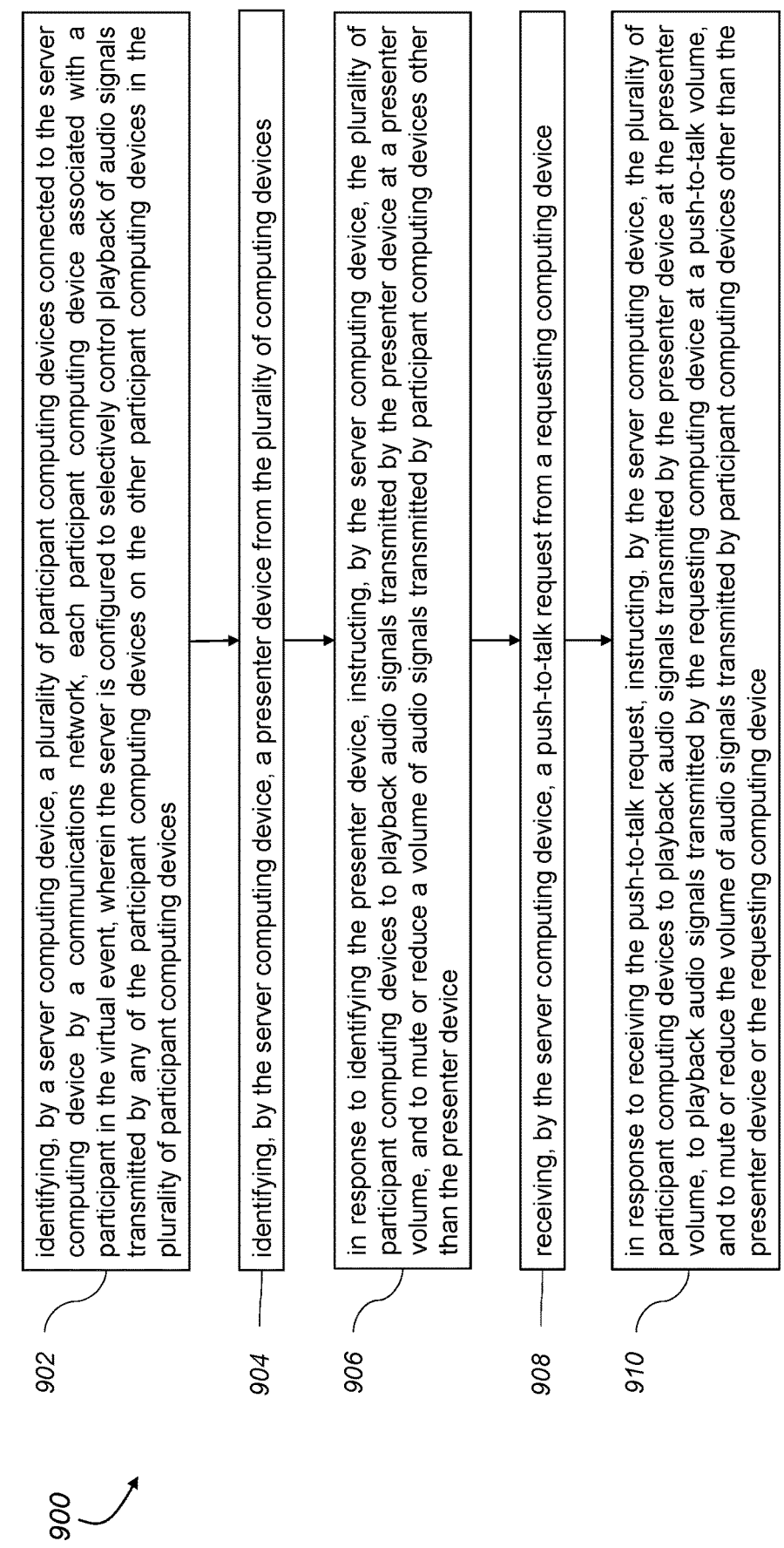
FIG. 9 illustrates an exemplary process for conducting a virtual event including push-to-talk audience interactions.

FIG. 9 illustrates an exemplary process 900 for conducting a virtual event including push-to-talk audience interactions. As shown, the process 900 includes identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices (902); identifying, by the server computing device, a presenter device from the plurality of computing devices (904); in response to identifying the presenter device, instructing, by the server computing device, the plurality of participant computing devices to playback audio signals transmitted by the presenter device at a presenter volume, and to mute or reduce a volume of audio signals transmitted by participant computing devices other than the presenter device (906); receiving, by the server computing device, a push-to-talk request from a requesting computing device (908); and in response to receiving the push-to-talk request, instructing, by the server computing device, the plurality of participant computing devices to playback audio signals transmitted by the presenter device at the presenter volume, to playback audio signals transmitted by the requesting computing device at a push-to-talk volume, and to mute or reduce the volume of audio signals transmitted by participant computing devices other than the presenter device or the requesting computing device (910).

Figure 10:
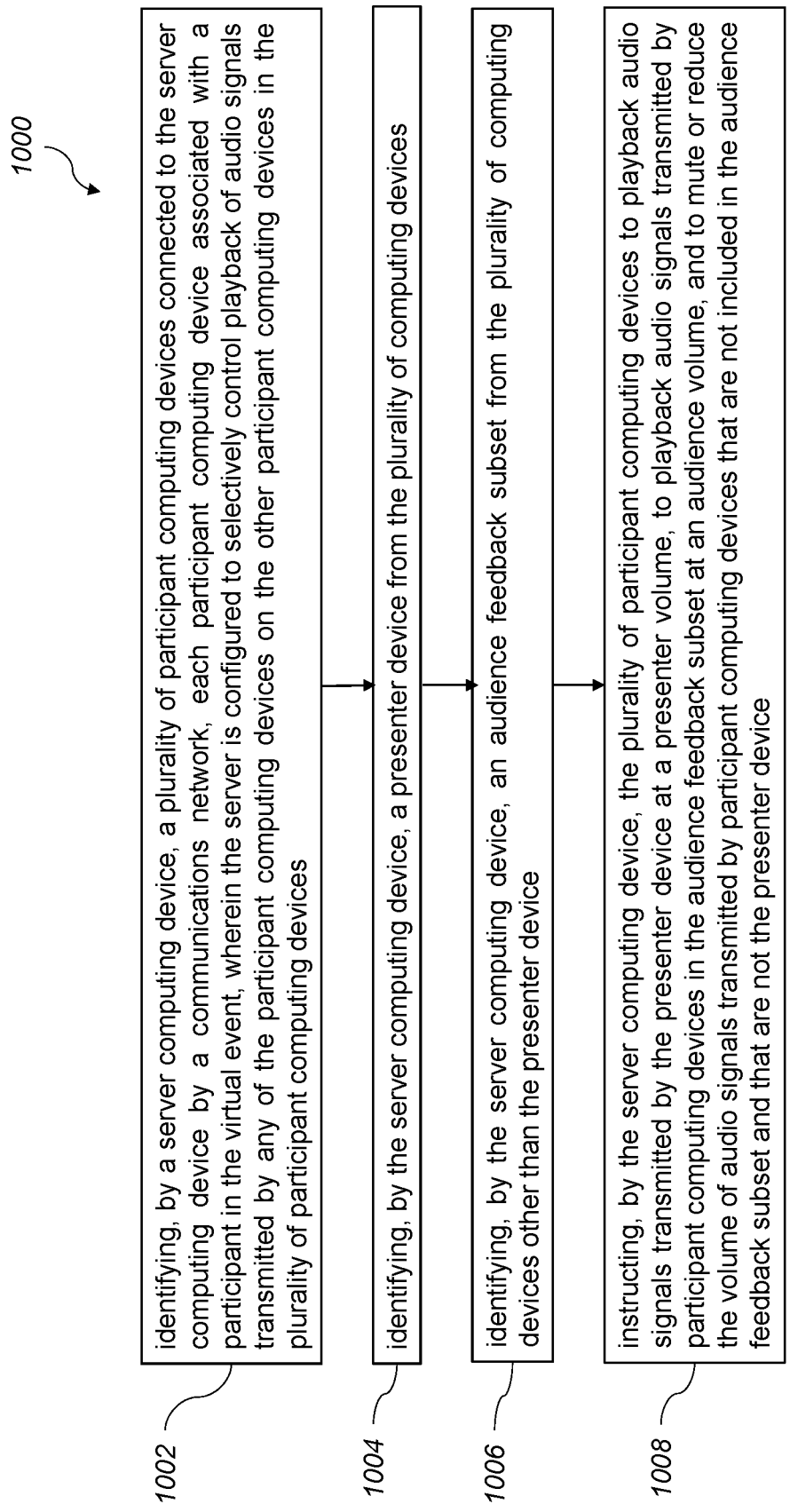
FIG. 10 illustrates an exemplary process for conducting a virtual event including layered audience feedback.

FIG. 10 illustrates an exemplary process 1000 for conducting a virtual event including layered audience feedback. As shown, the process 1000 includes identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices (1002); identifying, by the server computing device, a presenter device from the plurality of computing devices (1004); identifying, by the server computing device, an audience feedback subset from the plurality of computing devices other than the presenter device (1006); and instructing, by the server computing device, the plurality of participant computing devices to playback audio signals transmitted by the presenter device at a presenter volume, to playback audio signals transmitted by participant computing devices in the audience feedback subset at an audience volume, and to mute or reduce the volume of audio signals transmitted by participant computing devices that are not included in the audience feedback subset and that are not the presenter device (1008).

In some cases, the audience feedback subset is a first audience feedback subset, and the process 1000 includes determining, by the server computing device, that a particular amount of time has passed since identifying the first audience feedback subset; in response to determining that the particular amount of time has passed, identifying, by the server computing device, a second audience feedback subset from the plurality of computing devices, wherein the second audience feedback subset is different than the first audience feedback subset; and instructing, by the server computing device, the plurality of participant computing devices to playback audio signals transmitted by the presenter device at the presenter volume, to playback audio signals transmitted by participant computing devices in the second audience feedback subset at the audience volume, and to mute or reduce the volume of audio signals transmitted by participant computing devices that are not included in the second audience feedback subset and that are not the presenter device.

Figure 11:
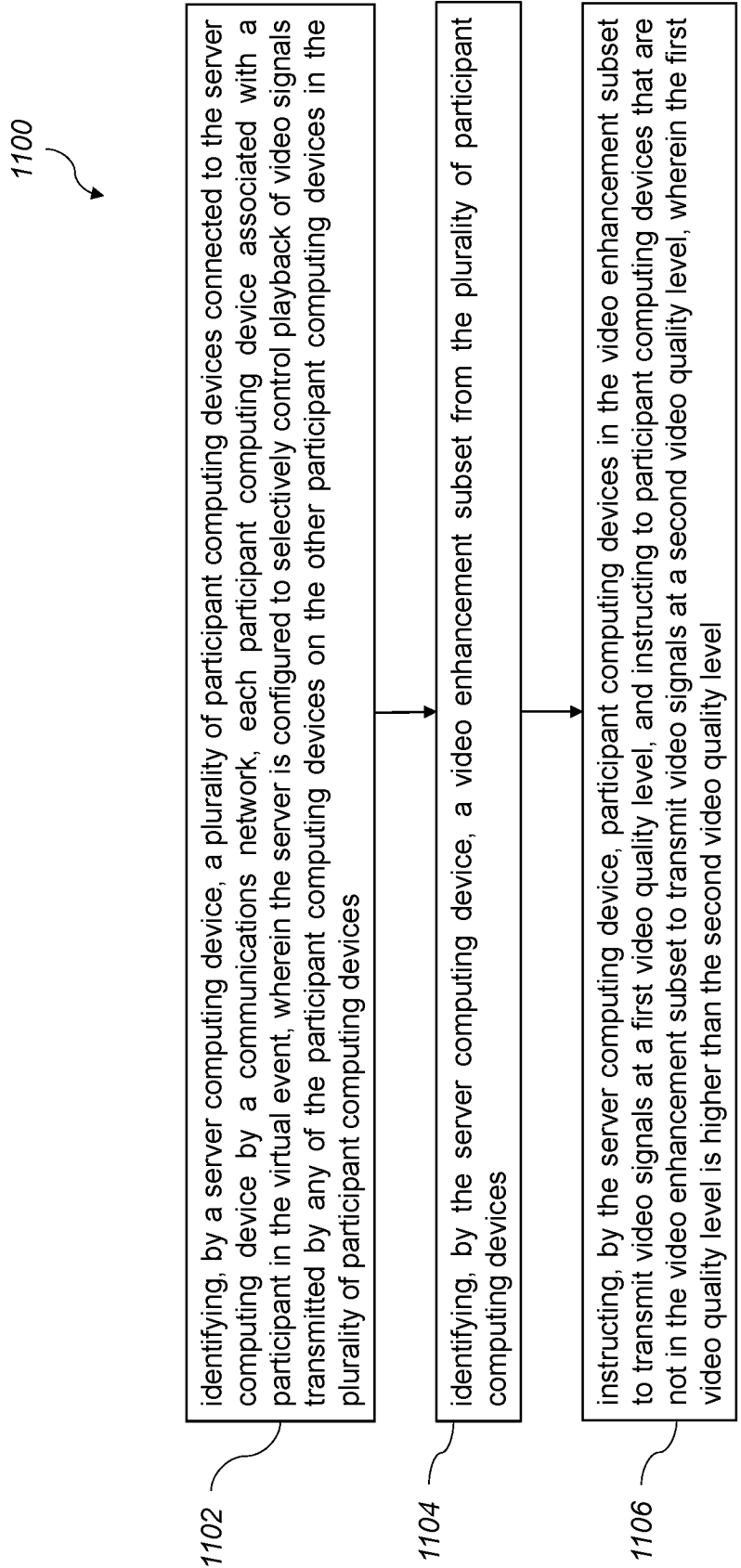
FIG. 11 illustrates an exemplary process for controlling participant video quality during a virtual event.

FIG. 11 illustrates an exemplary process 1100 for controlling participant video quality during a virtual event. As shown, the process 1100 includes identifying, by a server computing device, a plurality of participant computing devices connected to the server computing device by a communications network, each participant computing device associated with a participant in the virtual event, wherein the server is configured to selectively control playback of video signals transmitted by any of the participant computing devices on the other participant computing devices in the plurality of participant computing devices (1102); identifying, by the server computing device, a video enhancement subset from the plurality of participant computing devices (1104); and instructing, by the server computing device, participant computing devices in the video enhancement subset to transmit video signals at a first video quality level, and instructing to participant computing devices that are not in the video enhancement subset to transmit video signals at a second video quality level, wherein the first video quality level is higher than the second video quality level (1106).

Figure 12:
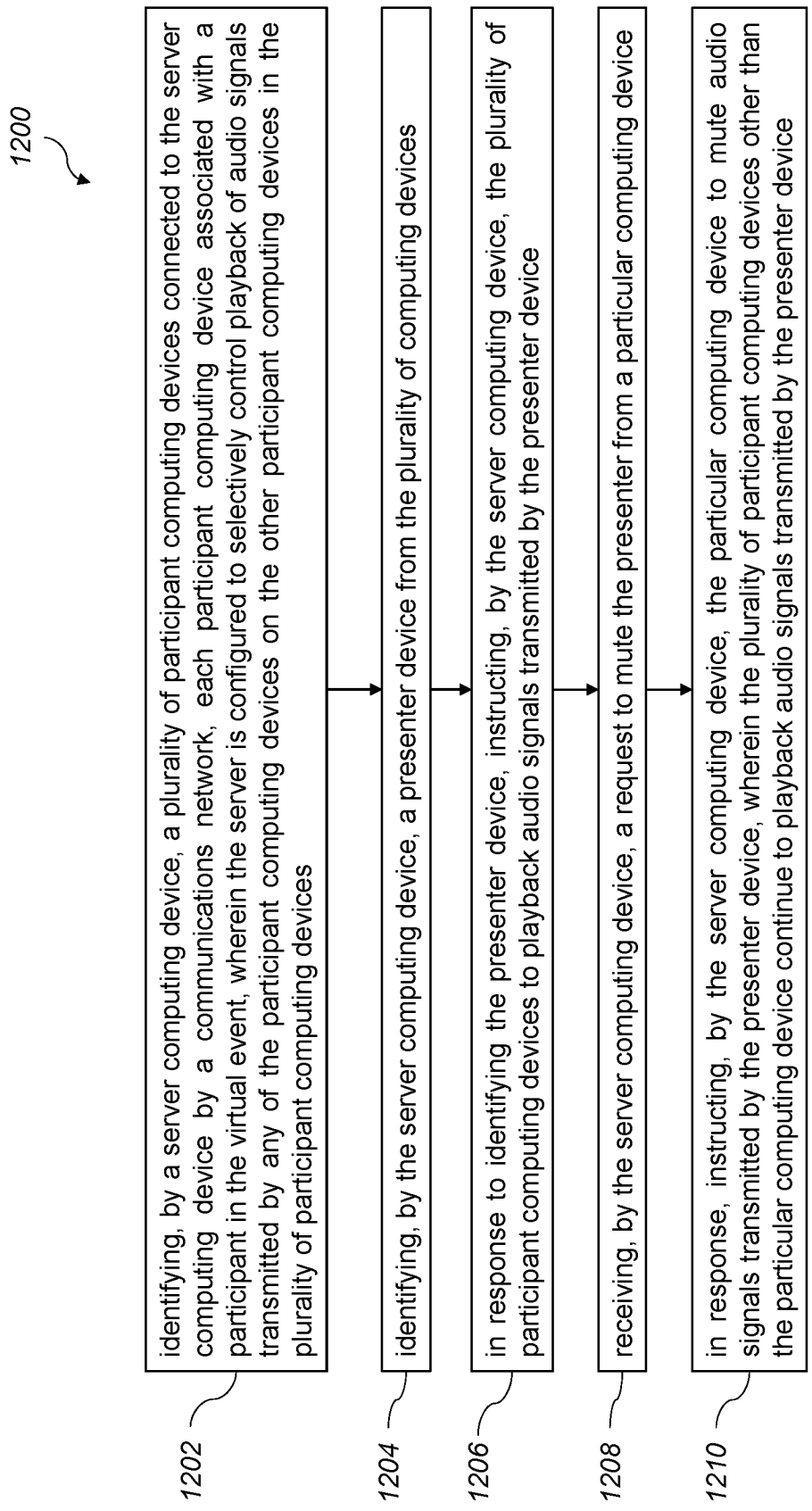
FIG. 12 illustrates an exemplary process for allowing participants to mute a presenter during a virtual event.

FIG. 12 illustrates an exemplary process 1200 for allowing participants to mute a presenter during a virtual event. As shown, the process 1200 includes identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices (1202); identifying, by the server computing device, a presenter device from the plurality of computing devices (1204); in response to identifying the presenter device, instructing, by the server computing device, the plurality of participant computing devices to playback audio signals transmitted by the presenter device (1206); receiving, by the server computing device, a request to mute the presenter from a particular computing device (1208); and in response, instructing, by the server computing device, the particular computing device to mute audio signals transmitted by the presenter device, wherein the plurality of participant computing devices other than the particular computing device continue to playback audio signals transmitted by the presenter device (1210).

Figure 13:
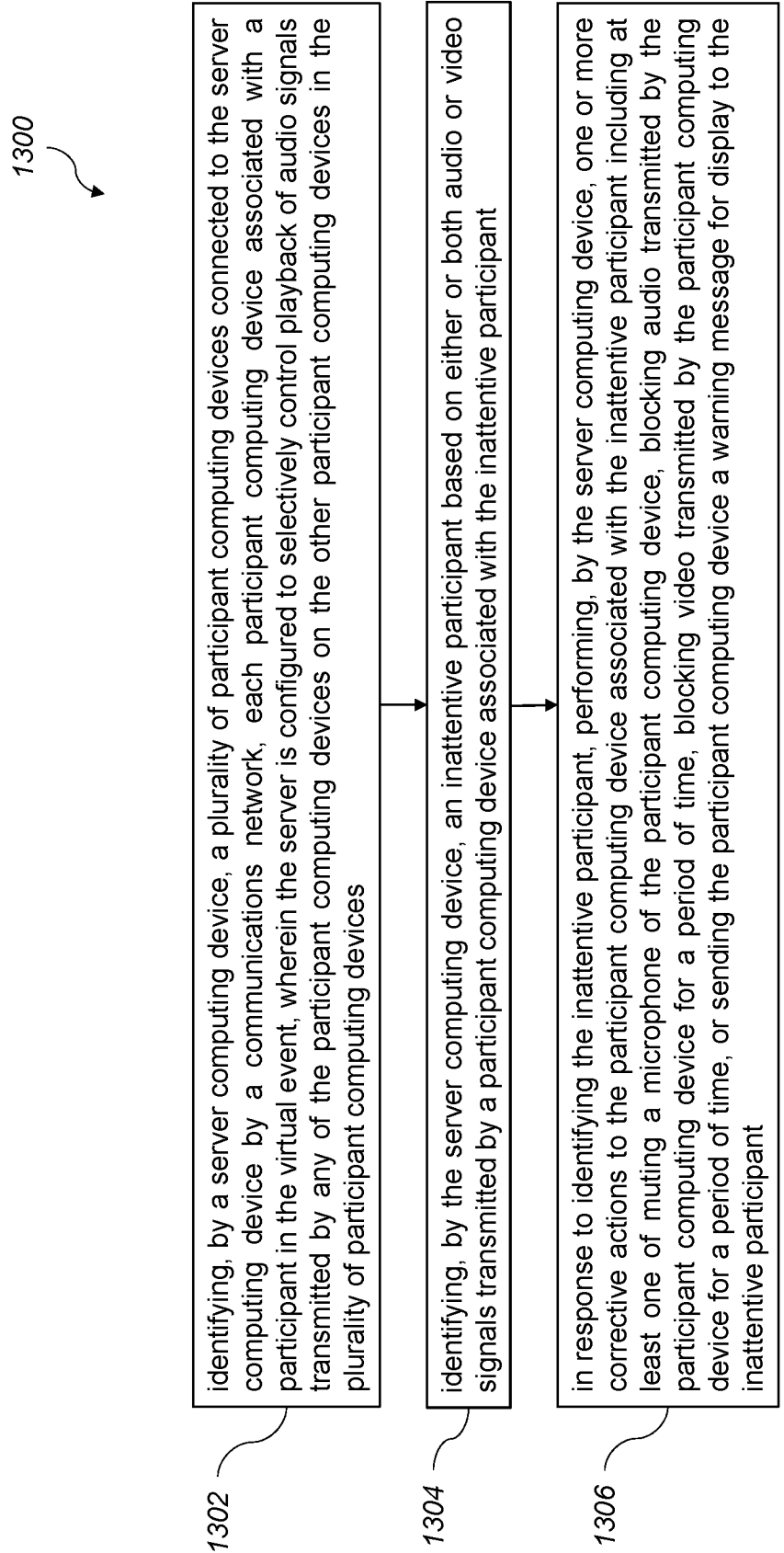
FIG. 13 illustrates an exemplary process for managing inattentive participants during a virtual event.

FIG. 13 illustrates an exemplary process 1300 for managing inattentive participants during a virtual event. As shown, the process 1300 includes identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices (1302); identifying, by the server computing device, an inattentive participant based on either or both audio or video signals transmitted by a participant computing device associated with the inattentive participant (1304); and in response to identifying the inattentive participant, performing, by the server computing device, one or more corrective actions to the participant computing device associated with the inattentive participant including at least one of muting a microphone of the participant computing device, blocking audio transmitted by the participant computing device for a period of time, blocking video transmitted by the participant computing device for a period of time, or sending the participant computing device a warning message for display to the inattentive participant (1306).

Figure 14:
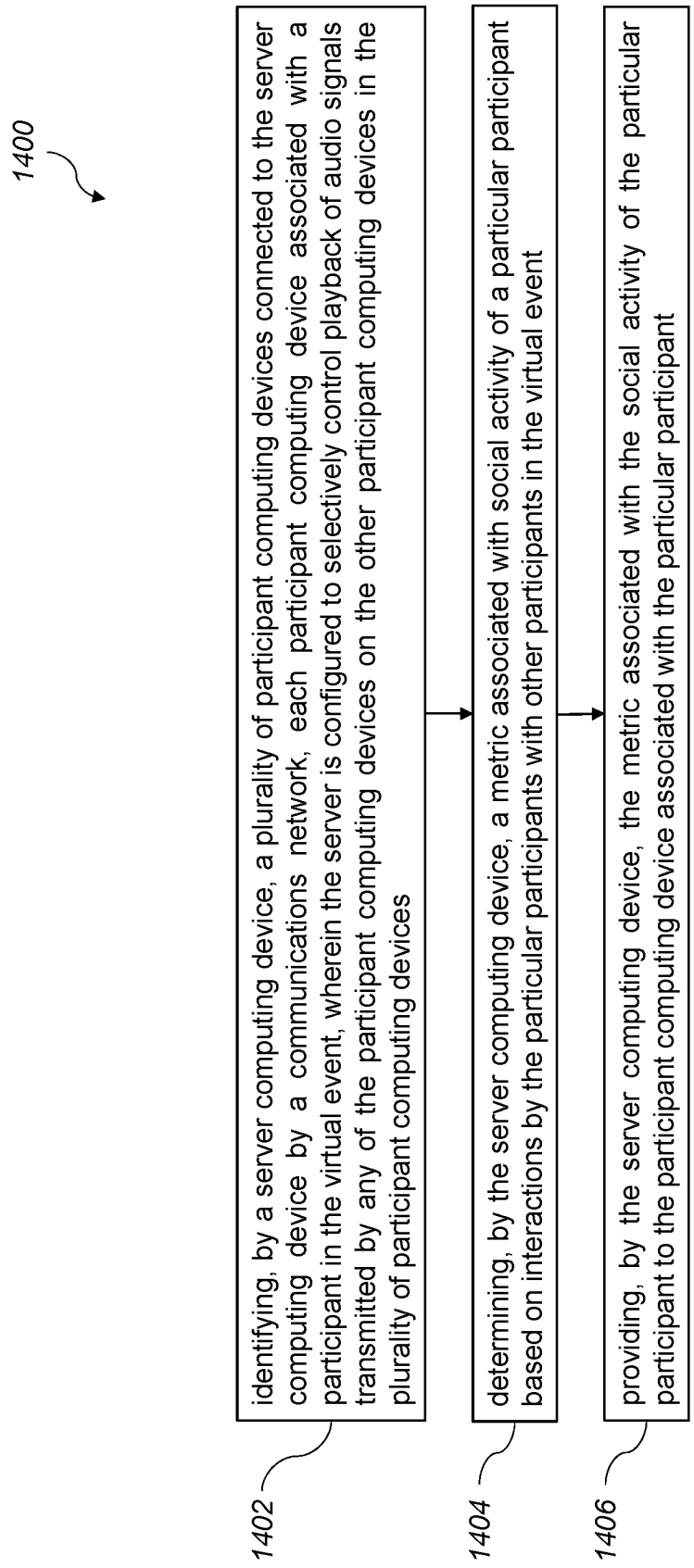
FIG. 14 illustrates an exemplary process for providing a social activity metric to participants in a virtual event.

FIG. 14 illustrates an exemplary process 1400 for providing a social activity metric to participants in a virtual event. As shown, the process 1400 includes identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices (1402); determining, by the server computing device, a metric associated with social activity of a particular participant based on interactions by the particular participants with other participants in the virtual event (1404); and providing, by the server computing device, the metric associated with the social activity of the particular participant to the participant computing device associated with the particular participant (1406).

Figure 15:
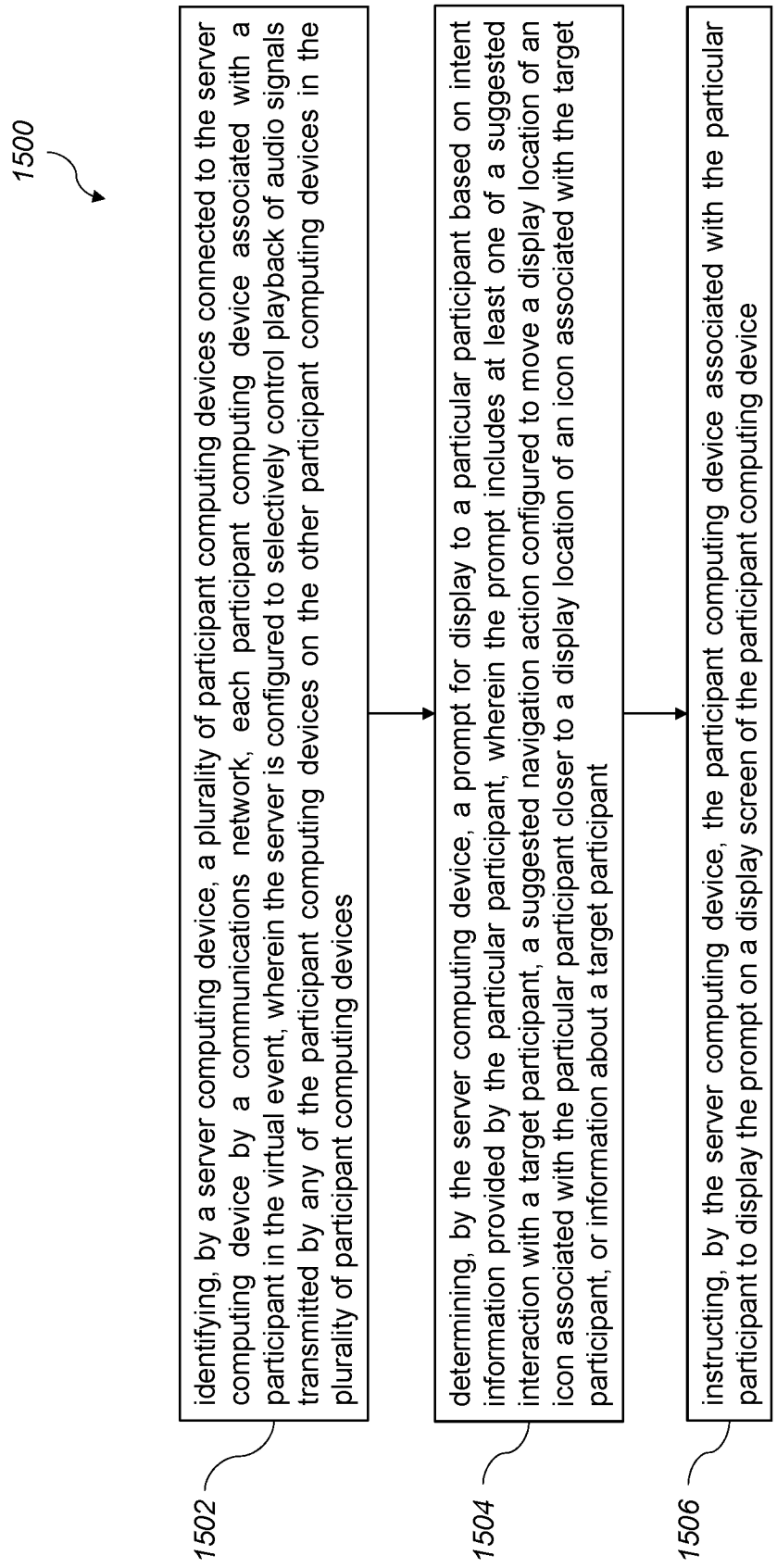
FIG. 15 illustrates an exemplary process for suggesting participant actions during a virtual event.

FIG. 15 illustrates an exemplary process 1500 for suggesting participant actions during a virtual event. As shown, the process 1500 includes identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices (1502); determining, by the server computing device, a prompt for display to a particular participant based on intent information provided by the particular participant, wherein the prompt includes at least one of a suggested interaction with a target participant, a suggested navigation action configured to move a display location of an icon associated with the particular participant closer to a display location of an icon associated with the target participant, or information about a target participant (1504); and instructing, by the server computing device, the participant computing device associated with the particular participant to display the prompt on a display screen of the participant computing device (1506).

Figure 16:
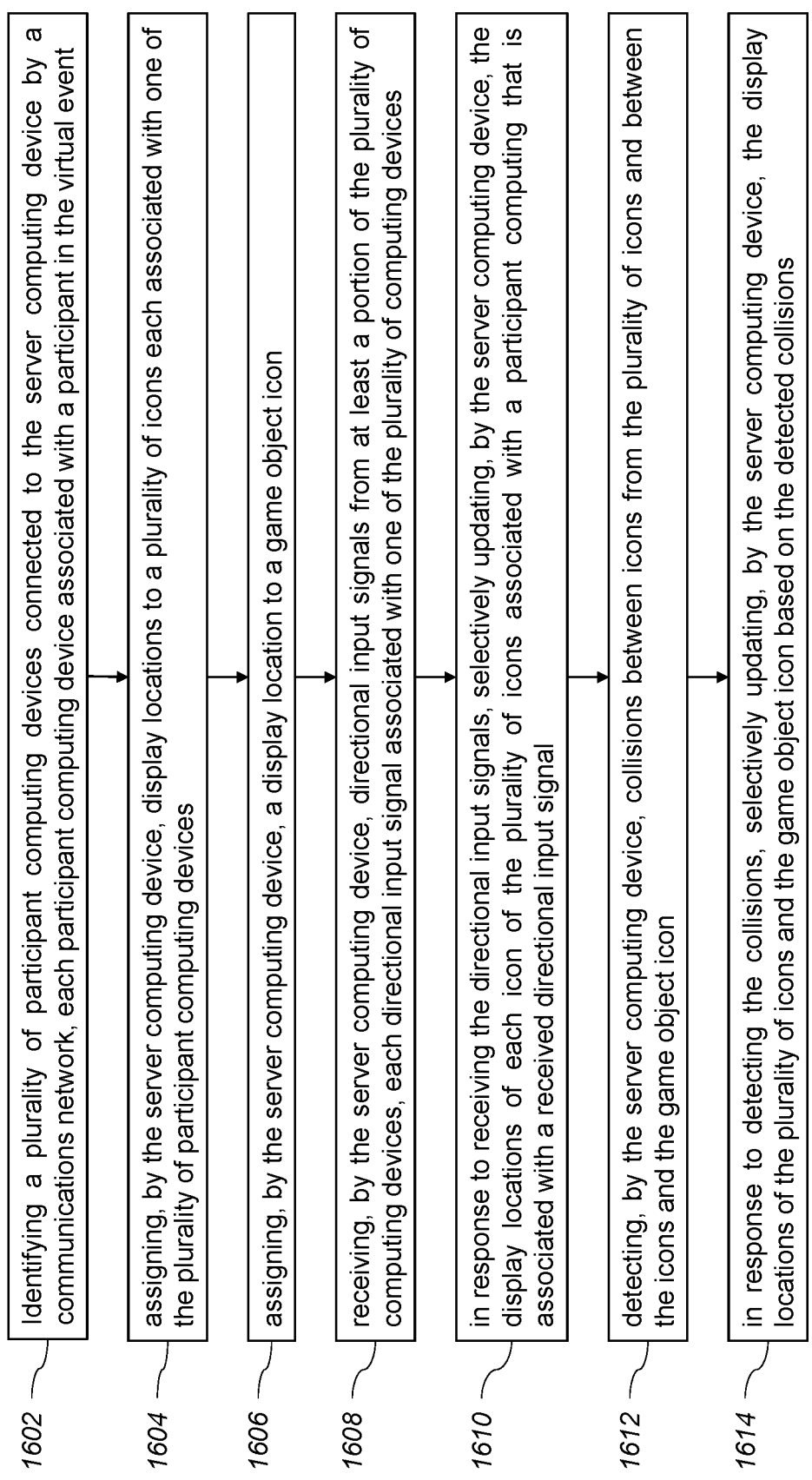
FIG. 16 illustrates an exemplary process for conducting a virtual game during a virtual event.

FIG. 16 illustrates an exemplary process 1600 for conducting a virtual game during a virtual event. As shown, the process 1600 includes identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices (1602); assigning, by the server computing device, display locations to a plurality of icons each associated with one of the plurality of participant computing devices, wherein each of the plurality of participant computing devices is configured to display each of the plurality of icons at the assigned display locations on a display screen at each participant computing device (1604); assigning, by the server computing device, a display location to a game object icon, wherein each of the plurality of participant computing devices is configured to display the game object icon at the assigned display location (1606); receiving, by the server computing device, directional input signals from at least a portion of the plurality of computing devices, each directional input signal associated with one of the plurality of computing devices (1608); in response to receiving the directional input signals, selectively updating, by the server computing device, the display locations of each icon of the plurality of icons associated with a participant computing that is associated with a received directional input signal (1610); detecting, by the server computing device, collisions between icons from the plurality of icons and between the icons and the game object icon (1612); and in response to detecting the collisions, selectively updating, by the server computing device, the display locations of the plurality of icons and the game object icon based on the detected collisions (1614).

Figure 17:
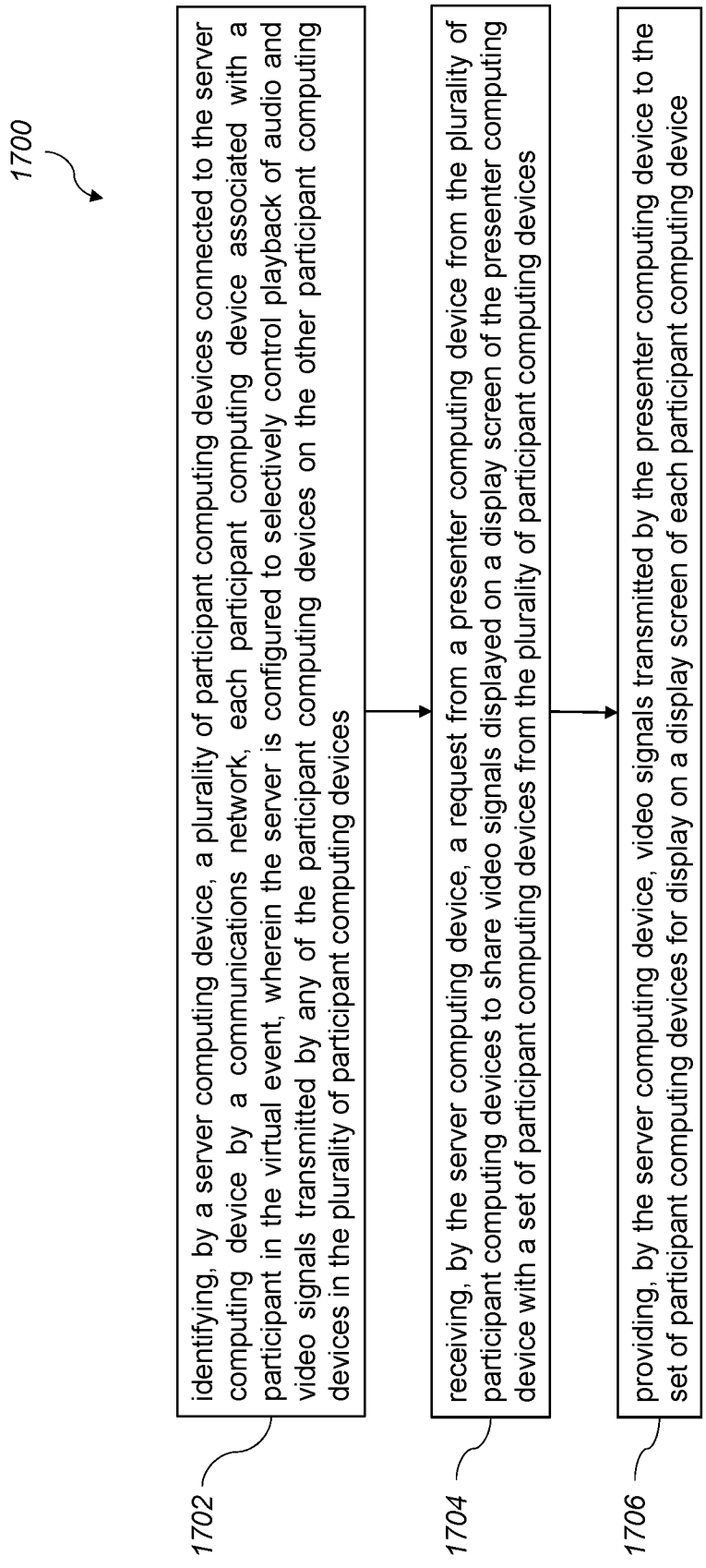
FIG. 17 illustrates an exemplary process for conducting a screen-share during a virtual event.

FIG. 17 illustrates an exemplary process 1700 for conducting a screen-share during a virtual event. As shown, the process 1700 includes identifying, by a server computing device, a plurality of participant computing devices connected to the server computing device by a communications network, each participant computing device associated with a participant in the virtual event, wherein the server is configured to selectively control playback of audio and video signals transmitted by any of the participant computing devices on the other participant computing devices in the plurality of participant computing devices (1702); receiving, by the server computing device, a request from a presenter computing device from the plurality of participant computing devices to share video signals displayed on a display screen of the presenter computing device with a set of participant computing devices from the plurality of participant computing devices (1704); and providing, by the server computing device, video signals transmitted by the presenter computing device to the set of participant computing devices for display on a display screen of each participant computing device (1706).

Figure 18:
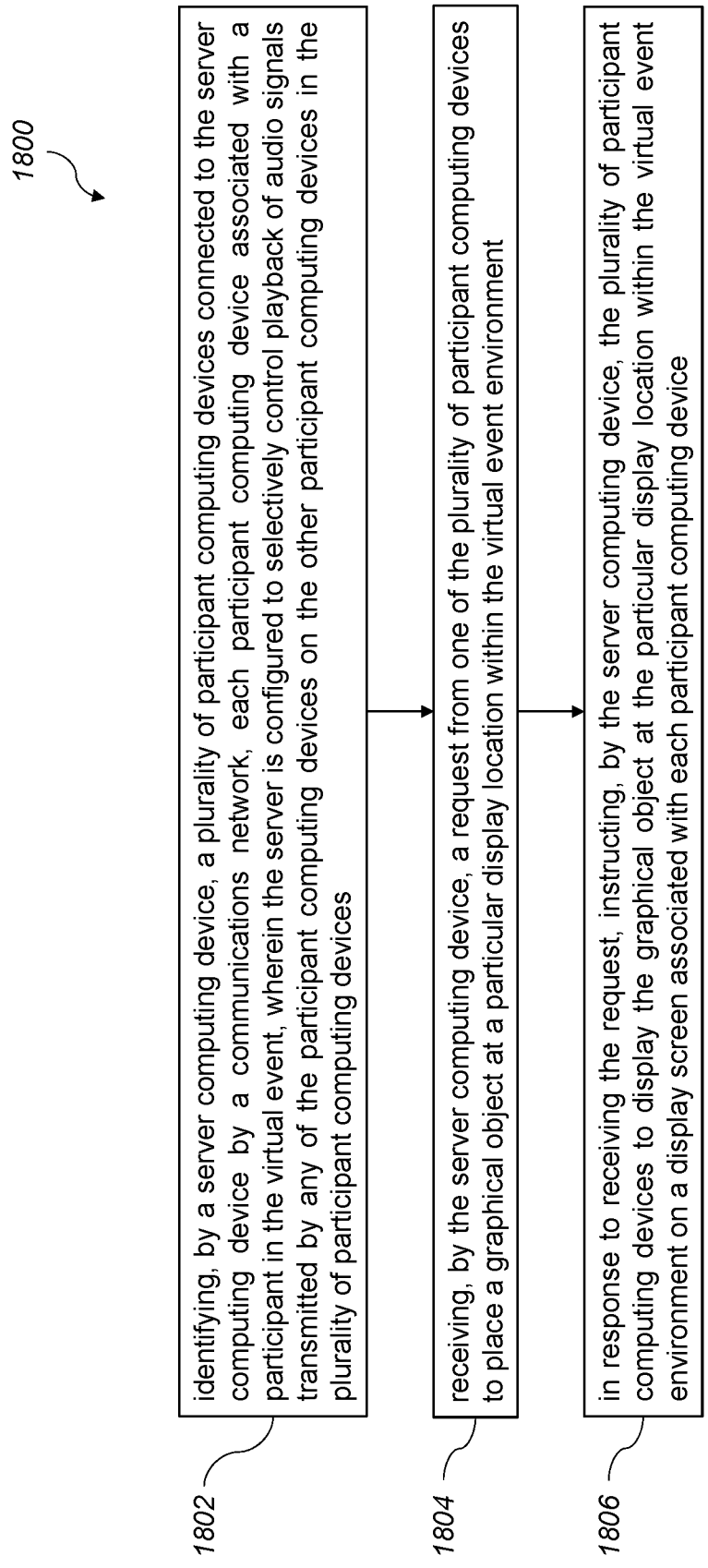
FIG. 18 illustrates an exemplary process for allowing participants to place graphical objects within a virtual event environment.

FIG. 18 illustrates an exemplary process 1800 for allowing participants to place graphical objects within a virtual event environment. As shown, the process 1800 includes identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices (1802); receiving, by the server computing device, a request from one of the plurality of participant computing devices to place a graphical object at a particular display location within the virtual event environment (1804); and in response to receiving the request, instructing, by the server computing device, the plurality of participant computing devices to display the graphical object at the particular display location within the virtual event environment on a display screen associated with each participant computing device (1806).

In some cases, the graphical object has an associated functionality, and the process 1800 includes receiving input from a participant computing device to interact with the graphical object, thereby enabling the particular computing device to access the graphical object's associated functionality.

In some cases, the graphical object's functionality includes at least one of the following: displaying information relating to the graphical object, the information including one or more of descriptive text, a Uniform Resource Locator (URL), a still image, or a video image; or changing an appearance of the graphical object; or alerting another participant's computing device that the particular computing device has interacted with the graphical object.

In some implementations, the graphical object is associated with a product for sale and includes a Uniform Resource Locator (URL) associated with a webpage providing information about the product for sale.

Figure 19:
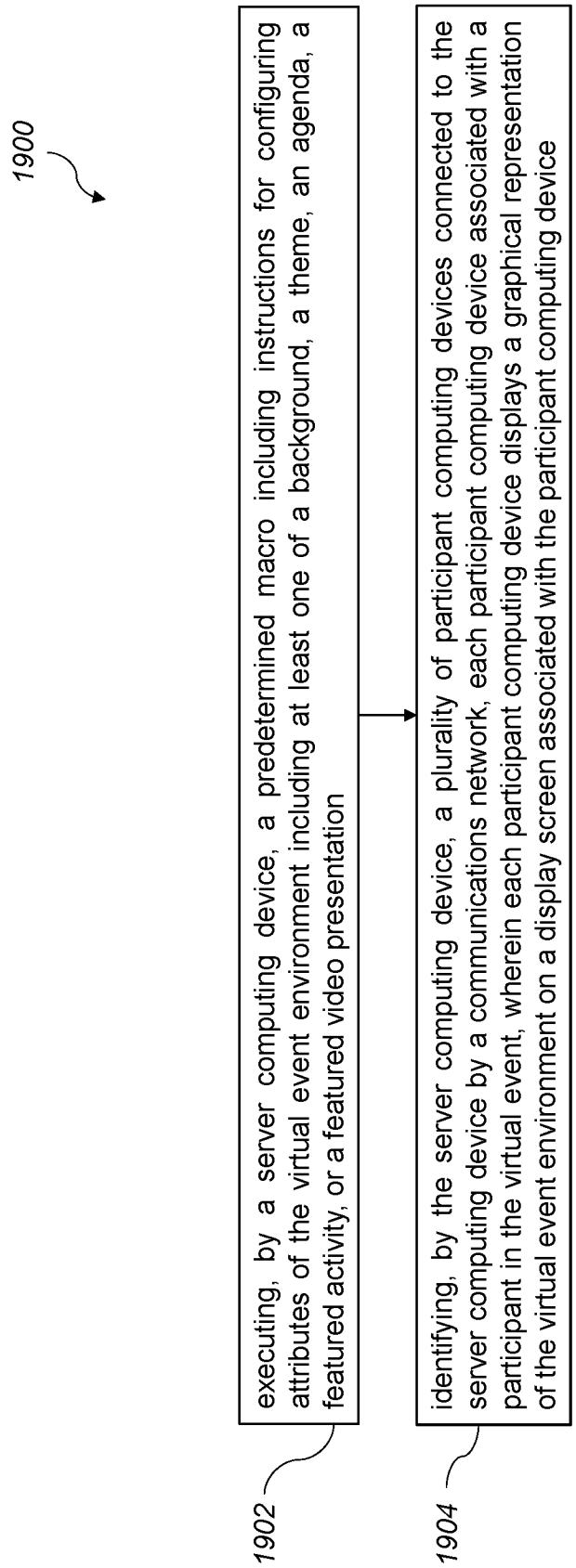
FIG. 19 illustrates an exemplary process for configuring a virtual event environment using a macro.

FIG. 19 illustrates an exemplary process 1900 for configuring a virtual event environment using a macro. As shown, the process 1900 includes executing, by a server computing device, a predetermined macro including instructions for configuring attributes of the virtual event environment including at least one of a background, a theme, an agenda, a featured activity, or a featured video presentation (1902); and identifying, by the server computing device, a plurality of participant computing devices connected to the server computing device by a communications network, each participant computing device associated with a participant in the virtual event, wherein each participant computing device displays a graphical representation of the virtual event environment on a display screen associated with the participant computing device (1904).

In some cases, the process 1900 includes prior to executing the macro, downloading, by the server computing device, the macro from an online marketplace including a plurality of macros.

Figure 20:
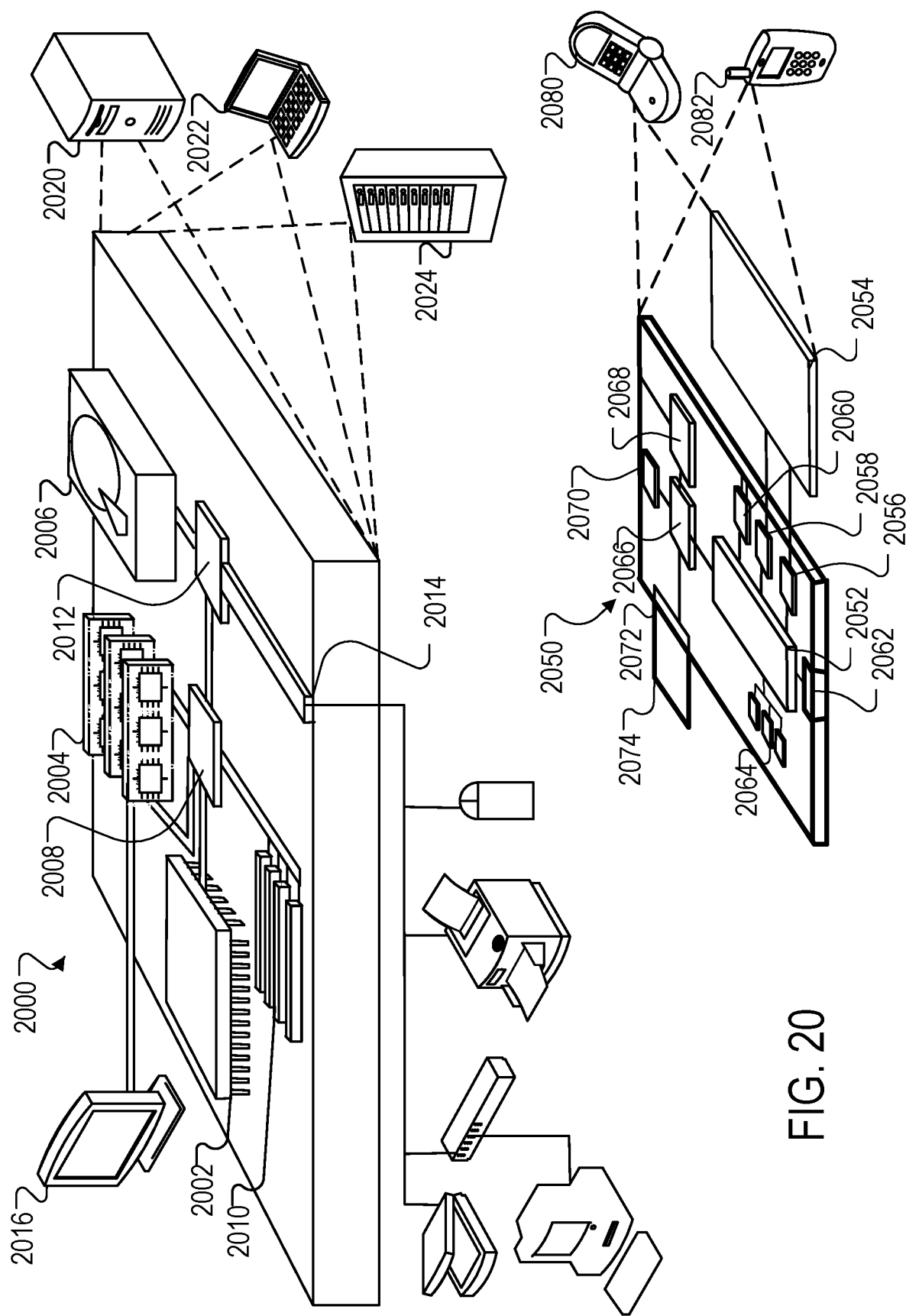
FIG. 20 illustrates a generic, exemplary computing environment with which the subject matter described here can be implemented.

FIG. 20 is a block diagram of computing devices 2000, 2050 that may be used to implement the systems and methods described in this document, as either a client or as a server or plurality of servers. Computing device 2000 is intended to represent various forms of digital computers, such as laptops, desktops, workstations, personal digital assistants, servers, blade servers, mainframes, and other appropriate computers. Computing device 2050 is intended to represent various forms of mobile devices, such as personal digital assistants, cellular telephones, smartphones, and other similar computing devices. Additionally, computing device 2000 or 2050 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. Additionally, the processor may be implemented using any of a number of architectures. For example, the processor 2010 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT (Thin-Film-Transistor Liquid Crystal Display) display or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provided in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provide as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052 that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, WiFi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smartphone 2082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method of conducting a virtual event, the method comprising:
   displaying, on a display screen of a computing device, a plurality of icons, each icon representing a different virtual event participant, wherein the plurality of icons includes a first icon representing a virtual event participant associated with the computing device;
   receiving, from an input device of the computing device, input representing a direction of movement for the first icon; and
   in response to receiving the input, moving the first icon on the display screen in the direction represented by the input, wherein the first icon comprises video of the virtual event participant associated with the computing device;
   and further comprising:
   receiving, by the computing device, audio signals associated with a second icon of the plurality of icons; and
   playing, by the computing device, the received audio signals at a particular volume based on a distance between the first icon and the second icon on the display screen; and
   wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

2. The method of claim 1, wherein the particular volume decreases as the distance between the first icon and the second icon on the display screen increases.

3. The method of claim 1, further comprising:
   receiving, by the computing device, a plurality of audio signals each associated with one of the plurality of icons; and
   playing, by the computing device, each of the received plurality of audio signals at a particular volume based on a distance between the first icon and the icon associated with the received audio signal on the display screen.

4. The method of claim 3, further comprising:
   receiving, by the computing device, input designating a particular icon from the plurality of icons upon which to focus; and
   in response to the input, playing, by the computing device, audio signals associated with the particular icon at a first volume level, and playing audio signals associated with icons other than the particular icon at a second volume level, wherein the first volume level is greater than the second volume level.

5. A non-transitory, computer-readable medium storing instructions operable when executed to cause at least one processor to perform operations comprising:
   displaying, on a display screen of a computing device, a plurality of icons, each icon representing a different virtual event participant, wherein the plurality of icons includes a first icon representing a virtual event participant associated with the computing device; and
   receiving, from an input device of the computing device, input representing a direction of movement for the first icon, and, in response, moving the first icon on the display screen in the direction represented by the input, wherein the first icon comprises video of the virtual event participant associated with the computing device;
   and further comprising:
   receiving, by the computing device, audio signals associated with a second icon of the plurality of icons; and
   playing, by the computing device, the received audio signals at a particular volume based on a distance between the first icon and the second icon on the display screen; and
   wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

6. The non-transitory, computer-readable medium of claim 5, wherein the particular volume decreases as the distance between the first icon and the second icon on the display screen increases.

7. The non-transitory, computer-readable medium of claim 5, the operations further comprising:
   receiving, by the computing device, a plurality of audio signals each associated with one of the plurality of icons; and
   playing, by the computing device, each of the received plurality of audio signals at a particular volume based on a distance between the first icon and the icon associated with the received audio signal on the display screen.

8. The non-transitory, computer-readable medium of claim 7, the operations further comprising:
   receiving, by the computing device, input designating a particular icon from the plurality of icons upon which to focus; and
   in response to the input, playing, by the computing device, audio signals associated with the particular icon at a first volume level, and playing audio signals associated with icons other than the particular icon at a second volume level, wherein the first volume level is greater than the second volume level.

9. A system comprising:
non-transitory, computer-readable medium for storing data; and
one or more processors operable to perform operations comprising:
displaying, on a display screen of a computing device, a plurality of icons, each icon representing a different virtual event participant, wherein the plurality of icons includes a first icon representing a virtual event participant associated with the computing device; and
receiving, from an input device of the computing device, input representing a direction of movement for the first icon, and, in response, moving the first icon on the display screen in the direction represented by the input, wherein the first icon comprises video of the virtual event participant associated with the computing device;
and further comprising:
receiving, by the computing device, audio signals associated with a second icon of the plurality of icons; and
playing, by the computing device, the received audio signals at a particular volume based on a distance between the first icon and the second icon on the display screen; and
wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

10. The system of claim 9, wherein the particular volume decreases as the distance between the first icon and the second icon on the display screen increases.

11. The system of claim 9, the operations further comprising:
receiving, by the computing device, a plurality of audio signals each associated with one of the plurality of icons; and
playing, by the computing device, each of the received plurality of audio signals at a particular volume based on a distance between the first icon and the icon associated with the received audio signal on the display screen.

12. The system of claim 11, the operations further comprising:
receiving, by the computing device, input designating a particular icon from the plurality of icons upon which to focus; and
in response to the input, playing, by the computing device, audio signals associated with the particular icon at a first volume level, and playing audio signals associated with icons other than the particular icon at a second volume level, wherein the first volume level is greater than the second volume level.

13. A method of conducting a virtual event, the method comprising:
displaying, on a display screen of a computing device, a plurality of icons, each icon representing a different virtual event participant, wherein the plurality of icons includes a first icon representing a virtual event participant associated with the computing device;
identifying, by the computing device, a subset of the plurality of icons including the first icon;
grouping, by the computing device, the subset of the plurality of icons into an audio group;
receiving, by the computing device, a plurality of audio signals each associated with one of the plurality of icons; and
playing, by the computing device, each of the received plurality of audio signals, wherein audio signals received from icons included in the audio group are played at a first volume, wherein audio signals received from icons not included in the audio group are played at a second volume, and wherein the first volume is greater than the second volume.

14. The method of claim 13, wherein identifying the subset of the plurality of icons includes identifying icons that are located within a certain distance of each other.

15. The method of claim 13, wherein identifying the subset of the plurality of icons includes receiving user input identifying the icons.

16. The method of claim 13, further comprising:
identifying, by the computing device, an icon from the plurality of icons that is not included within the audio group; and
in response, adding, by the computing device, the identified icon to the audio group.

17. The method of claim 16, wherein identifying the icon from the plurality of icons that is not included within the audio group includes identifying the icon based on the icon's proximity to the audio group.

18. The method of claim 16, wherein identifying the icon from the plurality of icons that is not included within the audio group includes identifying the icon based on a speed at which the icon is approaching a location of the audio group on the display screen.

19. The method of claim 16, wherein identifying the icon from the plurality of icons that is not included within the audio group includes identifying the icon based on an amount of time the icon has spent within a particular distance from a location of the audio group on the display screen.

20. The method of claim 16, wherein identifying the icon from the plurality of icons that is not included within the audio group includes receiving user input identifying the icon.

21. The method of claim 13, further comprising:
displaying, on the display screen, a visual indication of which icons from the plurality of icons are included in the audio group.

22. A method of conducting a hybrid physical and virtual event, the method comprising:
providing a kiosk arranged in a physical meeting space, the kiosk including a microphone, a camera, an input device, and a display screen, and being connected to a communications network;
displaying, on the display screen of the kiosk, a plurality of icons, each icon representing a different virtual event participant associated with a remote computing device;
updating, on the display screen of the kiosk, a location at which each of the plurality of icons is displayed based on user input received by the remote computing device associated with each icon; and
receiving, by the kiosk, a plurality of audio signals associated with one or more of the plurality of icons; and
playing, by the kiosk, each of the received plurality of audio signals at a particular volume based on a distance between the icon representing the kiosk and the icon associated with the received audio signal on the display screen, wherein a first icon comprises video of a virtual event participant associated with a first computing device;

and further comprising:

receiving, by the first computing device, audio signals associated with a second icon of the plurality of icons; and playing, by the first computing device, the received audio signals at a particular volume based on a distance between the first icon and the second icon on the display screen; and wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

23. A method of conducting a virtual event, the method comprising:

displaying, on a display screen of a computing device, a plurality of icons, each icon representing a different virtual event participant;

identifying, by the computing device, metadata associated with one or more virtual event participants represented by the plurality of icons, wherein the metadata includes at least one of a name, a title, an organization, an industry, or a relationship to another virtual event participant; and selectively providing, by the computing device, metadata associated with a particular virtual event participant to one or more other virtual event participants, wherein a first icon comprises video of a virtual event participant associated with a first computing device;

and further comprising:

receiving, by the computing device, audio signals associated with a second icon of the plurality of icons; and playing, by the first computing device, the received audio signals at a particular volume based on a distance between the first icon and the second icon on the display screen; and wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

24. A method of conducting a virtual event, the method comprising:

identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices;

identifying, by the server computing device, a presenter device from the plurality of computing devices; and in response to identifying the presenter device, instructing, by the server computing device, the plurality of participant computing devices to playback audio signals transmitted by the presenter device at a presenter volume, and to playback audio signals transmitted by participant computing devices other than the presenter device at an audience volume, wherein the audience volume is less than the presenter volume, wherein a first icon comprises video of the virtual event participant associated with a first computing device;

and further comprising:

receiving, by the first computing device, audio signals associated with a second icon of the plurality of icons; and playing, by the first computing device, the received audio signals at a particular volume based on a distance between the first icon and the second icon on the display screen; and wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

25. A method of conducting a virtual event, the method comprising:

identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices;

identifying, by the server computing device, a presenter device from the plurality of computing devices;

in response to identifying the presenter device, instructing, by the server computing device, the plurality of participant computing devices to playback audio signals transmitted by the presenter device at a presenter volume, and to mute or reduce a volume of audio signals transmitted by participant computing devices other than the presenter device;

receiving, by the server computing device, a push-to-talk request from a requesting computing device; and in response to receiving the push-to-talk request, instructing, by the server computing device, the plurality of participant computing devices to playback audio signals transmitted by the presenter device at the presenter volume, to playback audio signals transmitted by the requesting computing device at a push-to-talk volume, and to mute or reduce the volume of audio signals transmitted by participant computing devices other than the presenter device or the requesting computing device, wherein a first icon comprises video of the virtual event participant associated with the computing device;

and further comprising:

receiving, by the computing device, audio signals associated with a second icon of the plurality of icons; and playing, by the computing device, the received audio signals at a particular volume based on a distance between the first icon and the second icon on the display screen; and wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

26. A method of conducting a virtual event, the method comprising:
- identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices;
- identifying, by the server computing device, a presenter device from the plurality of computing devices;
- identifying, by the server computing device, an audience feedback subset from the plurality of computing devices other than the presenter device; and
- instructing, by the server computing device, the plurality of participant computing devices to playback audio signals transmitted by the presenter device at a presenter volume, to playback audio signals transmitted by participant computing devices in the audience feedback subset at an audience volume, and to mute or reduce the volume of audio signals transmitted by participant computing devices that are not included in the audience feedback subset and that are not the presenter device.

27. The method of claim 26, wherein the audience feedback subset is a first audience feedback subset, and the method further comprising:
- determining, by the server computing device, that a particular amount of time has passed since identifying the first audience feedback subset;
- in response to determining that the particular amount of time has passed, identifying, by the server computing device, a second audience feedback subset from the plurality of computing devices, wherein the second audience feedback subset is different than the first audience feedback subset; and
- instructing, by the server computing device, the plurality of participant computing devices to playback audio signals transmitted by the presenter device at the presenter volume, to playback audio signals transmitted by participant computing devices in the second audience feedback subset at the audience volume, and to mute or reduce the volume of audio signals transmitted by participant computing devices that are not included in the second audience feedback subset and that are not the presenter device.

28. A method of conducting a virtual event, the method comprising:
- identifying, by a server computing device, a plurality of participant computing devices connected to the server computing device by a communications network, each participant computing device associated with a participant in the virtual event, wherein the server is configured to selectively control playback of video signals transmitted by any of the participant computing devices on the other participant computing devices in the plurality of participant computing devices;
- identifying, by the server computing device, a video enhancement subset from the plurality of participant computing devices; and
- instructing, by the server computing device, participant computing devices in the video enhancement subset to transmit video signals at a first video quality level, and instructing to participant computing devices that are not in the video enhancement subset to transmit video signals at a second video quality level, wherein the first video quality level is higher than the second video quality level.

29. A method of conducting a virtual event, the method comprising:
- identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices;
- identifying, by the server computing device, a presenter device from the plurality of computing devices;
- in response to identifying the presenter device, instructing, by the server computing device, the plurality of participant computing devices to playback audio signals transmitted by the presenter device;
- receiving, by the server computing device, a request to mute the presenter from a particular computing device; and
- in response, instructing, by the server computing device, the particular computing device to mute audio signals transmitted by the presenter device, wherein the plurality of participant computing devices other than the particular computing device continue to playback audio signals transmitted by the presenter device, wherein a first icon comprises video of the virtual event participant associated with a first computing device;

and further comprising:
- receiving, by the first computing device, audio signals associated with a second icon of the plurality of icons; and
- playing, by the first computing device, the received audio signals at a particular volume based on a distance between the first icon and the second icon on the display screen; and
- wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

30. A method of conducting a virtual event, the method comprising:
- identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices;
- identifying, by the server computing device, an inattentive participant based on either or both audio or video signals transmitted by a participant computing device associated with the inattentive participant; and
- in response to identifying the inattentive participant, performing, by the server computing device, one or more corrective actions to the participant computing device associated with the inattentive participant including at least one of muting a microphone of the participant computing device, blocking audio transmitted by the participant computing device for a period of time, blocking video transmitted by the participant computing device for a period of time, or sending the participant computing device a warning message for display to the inattentive participant, wherein a first icon comprises video of the virtual event participant associated with a first computing device;

and further comprising:

receiving, by the computing device, audio signals associated with a second icon of the plurality of icons; and playing, by the first computing device, the received audio signals at a particular volume based on a distance between the first icon and the second icon on the display screen; and wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

31. A method of conducting a virtual event, the method comprising:

identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices;

determining, by the server computing device, a metric associated with social activity of a particular participant based on interactions by the particular participants with other participants in the virtual event; and providing, by the server computing device, the metric associated with the social activity of the particular participant to the participant computing device associated with the particular participant, wherein a first icon comprises video of the virtual event participant associated with a first computing device;

and further comprising:

receiving, by the first computing device, audio signals associated with a second icon of the plurality of icons; and playing, by the first computing device, the received audio signals at a particular volume based on a distance between the first icon and the second icon on the display screen; and wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

32. A method of conducting a virtual event, the method comprising:

identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices;

determining, by the server computing device, a prompt for display to a particular participant based on intent information provided by the particular participant, wherein the prompt includes at least one of a suggested interaction with a target participant, a suggested navigation action configured to move a display location of an icon associated with the particular participant closer to a display location of an icon associated with the target participant, or information about a target participant; and instructing, by the server computing device, the participant computing device associated with the particular participant to display the prompt on a display screen of the participant computing device, wherein a first icon comprises video of the virtual event participant associated with a first computing device;

and further comprising:

receiving, by the first computing device, audio signals associated with a second icon of the plurality of icons; and playing, by the first computing device, the received audio signals at a particular volume based on a distance between the first icon and the second icon on the display screen; and wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

33. A method of conducting a virtual event, the method comprising:

identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices;

assigning, by the server computing device, display locations to a plurality of icons each associated with one of the plurality of participant computing devices, wherein each of the plurality of participant computing devices is configured to display each of the plurality of icons at the assigned display locations on a display screen at each participant computing device;

assigning, by the server computing device, a display location to a game object icon, wherein each of the plurality of participant computing devices is configured to display the game object icon at the assigned display location;

receiving, by the server computing device, directional input signals from at least a portion of the plurality of computing devices, each directional input signal associated with one of the plurality of computing devices;

in response to receiving the directional input signals, selectively updating, by the server computing device, the display locations of each icon of the plurality of icons associated with a participant computing that is associated with a received directional input signal;

detecting, by the server computing device, collisions between icons from the plurality of icons and between the icons and the game object icon; and in response to detecting the collisions, selectively updating, by the server computing device, the display locations of the plurality of icons and the game object icon based on the detected collisions, wherein a first icon comprises video of the virtual event participant associated with a first computing device;

and further comprising:

receiving, by the first computing device, audio signals associated with a second icon of the plurality of icons; and playing, by the first computing device, the received audio signals at a particular volume based on a distance between the first icon and the second icon on the display screen; and wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

34. A method of conducting a virtual event, the method comprising:

identifying, by a server computing device, a plurality of participant computing devices connected to the server computing device by a communications network, each participant computing device associated with a participant in the virtual event, wherein the server is configured to selectively control playback of audio and video signals transmitted by any of the participant computing devices on the other participant computing devices in the plurality of participant computing devices;

receiving, by the server computing device, a request from a presenter computing device from the plurality of participant computing devices to share video signals displayed on a display screen of the presenter computing device with a set of participant computing devices from the plurality of participant computing devices; and providing, by the server computing device, video signals transmitted by the presenter computing device to the set of participant computing devices for display on a display screen of each participant computing device, wherein a first icon comprises video of the virtual event participant associated with a first computing device;

and further comprising:

receiving, by the first computing device, audio signals associated with a second icon of the plurality of icons; and playing, by the first computing device, the received audio signals at a particular volume based on a distance between the first icon and the second icon on the display screen; and wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

35. A method of conducting an event within a virtual event environment, the method comprising:

identifying, by a server computing device, a plurality of participant computing devices connected to the server computing device by a communications network, each participant computing device associated with a participant in the virtual event, wherein the server is configured to selectively control playback of audio signals transmitted by any of the participant computing devices on the other participant computing devices in the plurality of participant computing devices;

receiving, by the server computing device, a request from one of the plurality of participant computing devices to place a graphical object at a particular display location within the virtual event environment; and in response to receiving the request, instructing, by the server computing device, the plurality of participant computing devices to display the graphical object at the particular display location within the virtual event environment on a display screen associated with each participant computing device, wherein a first icon comprises video of the virtual event participant associated with a first computing device;

and further comprising:

receiving, by the first computing device, audio signals associated with a second icon of the plurality of icons; and playing, by the first computing device, the received audio signals at a particular volume based on a distance between the first icon and the second icon on the display screen; and wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

36. The method of claim 35, wherein the graphical object has an associated functionality, and further comprising:

receiving input from a participant computing device to interact with the graphical object, thereby enabling the particular computing device to access the graphical object's associated functionality.

37. The method of claim 36, wherein the graphical object's functionality includes at least one of the following:

displaying information relating to the graphical object, the information including one or more of descriptive text, a Uniform Resource Locator (URL), a still image, or a video image; or changing an appearance of the graphical object; or alerting another participant's computing device that the particular computing device has interacted with the graphical object.

38. The method of claim 35, wherein the graphical object is associated with a product for sale and includes a Uniform Resource Locator (URL) associated with a webpage providing information about the product for sale.

39. A method of conducting an event within a virtual event environment, the method comprising:

executing, by a server computing device, a predetermined macro including instructions for configuring attributes of the virtual event environment including at least one of a background, a theme, an agenda, a featured activity, or a featured video presentation; and identifying, by the server computing device, a plurality of participant computing devices connected to the server computing device by a communications network, each participant computing device associated with a participant in the virtual event, wherein each participant computing device displays a graphical representation of the virtual event environment on a display screen associated with the participant computing device, wherein a first icon comprises video of the virtual event participant associated with a first computing device;

and further comprising:

receiving, by the first computing device, audio signals associated with a second icon of the plurality of icons; and playing, by the first computing device, the received audio signals at a particular volume based on a distance between the first icon and the second icon on the display screen; and wherein the particular volume is proportional to a volume level at which the virtual event participant associated with the first icon would hear the audio signals emitted by the virtual event participant associated with the second icon at a physical distance in a physical space proportional to the distance between the first icon and the second icon on the display screen.

40. The method of claim 39, further comprising:

prior to executing the macro, downloading, by the server computing device, the predetermined macro from an online marketplace including a plurality of macros.

41. The method of claim 39, further comprising, prior to executing the predetermined macro:

receiving input from an event planner relating to one or more of a specific environment for the virtual event, one or more specific event activities to be performed during the virtual event, or different resources to be made available to event participants during the virtual event; and modifying the macro to include the input received from the event planner.

* * * * *